US008847167B2

(12) United States Patent
Tajima

(10) Patent No.: US 8,847,167 B2
(45) Date of Patent: Sep. 30, 2014

(54) RADIATION IMAGE CAPTURING APPARATUS

(75) Inventor: Hideaki Tajima, Hachioji (JP)

(73) Assignee: Konica Minolta Medical & Graphic, Inc. (JP)

( * ) Notice: Subject to any disclaimer, the term of this patent is extended or adjusted under 35 U.S.C. 154(b) by 158 days.

(21) Appl. No.: 13/487,400

(22) Filed: Jun. 4, 2012

(65) Prior Publication Data

US 2012/0318994 A1   Dec. 20, 2012

(30) Foreign Application Priority Data

Jun. 14, 2011   (JP) ................................. 2011-131753

(51) Int. Cl.
*G01T 1/24*   (2006.01)
*H04N 5/361*   (2011.01)
*H04N 5/359*   (2011.01)

(52) U.S. Cl.
CPC ............... *H04N 5/359* (2013.01); *H04N 5/361* (2013.01)
USPC .................................................. 250/370.08

(58) Field of Classification Search
USPC .................................. 250/370.08, 208.1, 394
See application file for complete search history.

(56) References Cited

U.S. PATENT DOCUMENTS

| 7,211,803 | B1 | 5/2007 | Dhurjaty et al. | |
| 2011/0128359 | A1* | 6/2011 | Yokoyama et al. | 348/61 |
| 2011/0317809 | A1* | 12/2011 | Eguchi | 378/62 |
| 2012/0132825 | A1* | 5/2012 | Amitani et al. | 250/394 |
| 2012/0153177 | A1* | 6/2012 | Iwakiri et al. | 250/370.09 |
| 2012/0170827 | A1* | 7/2012 | Yagi et al. | 382/132 |
| 2012/0199749 | A1* | 8/2012 | Kameshima et al. | 250/370.08 |
| 2013/0032696 | A1* | 2/2013 | Tajima | 250/208.1 |
| 2013/0068961 | A1* | 3/2013 | Tajima | 250/394 |

FOREIGN PATENT DOCUMENTS

| JP | 6-342099 A | 12/1994 |
| JP | 9-73144 A | 3/1997 |
| JP | 2006-58124 A | 3/2006 |
| JP | 2009-219538 A | 10/2009 |

\* cited by examiner

*Primary Examiner* — David Porta
*Assistant Examiner* — Taeho Jo
(74) *Attorney, Agent, or Firm* — Cantor Colburn LLP

(57) ABSTRACT

The control device allows a step of reading the leak data and a step of resetting each radiation detection element to be executed alternately before radiation image capturing. When the data exceed a threshold value, the irradiation start is detected and electric charge is accumulated. Then, the step of reading the image data is executed. After this, the control device further allows a step of reading the leak data and a step of resetting each radiation detection element to be performed alternately at the same cycle time as that in the step of reading the leak data and the step of resetting each radiation detection element performed before detecting the irradiation start. After transfer to the electric charge accumulation state, the control device further permits a step of reading the offset data to be executed at the same cycle time as that in the step of reading the image data.

10 Claims, 26 Drawing Sheets

RADIATION IMAGE CAPTURING APPARATUS

This application is based on Japanese Patent Application No. 2011-131753 filed on Jun. 14, 2011 with Japanese Patent Office, the entire content of which is hereby incorporated by reference.

BACKGROUND OF THE INVENTION

The present invention relates to a radiation image capturing apparatus, particularly to a radiation image capturing apparatus wherein a radiation image capturing apparatus performs radiation image capturing operations by detecting irradiation by itself.

There has been development of various types of radiation image capturing apparatuses including a so-called direct type radiation image capturing apparatus that generates an electric charge through a detection element in response to the dosage of applied radiation such as X-rays and converts the electric charge into an electric signal, and a so-called indirect radiation image capturing apparatus that uses a scintillator etc. to convert the applied radiation into electromagnetic waves having other wavelengths such as visible light, then generates an electric charge through a photoelectric conversion element such as a photodiode in response to the energy of the electromagnetic wave having been converted and applied, and converts the electric change into an electric signal (i.e., image data). In the following description of the embodiments of the present invention, the detection element in the direct type radiation image capturing apparatus and the photoelectric conversion element in the indirect radiation image capturing apparatus will be collectively referred to as a radiation detection element.

This type of radiation image capturing apparatus is known under the name of FPD (Flat Panel Detector). In the conventional art, this radiation image capturing apparatus has been designed to be formed integrally with a support base (or bucky device) (refer to the Unexamined Japanese Patent Application Publication No. Hei 9(1997)-73144, for example). In recent years, there has been development of portable radiation image capturing apparatuses wherein a radiation detection element and others are incorporated in a housing for easy transportation. These portable radiation image capturing apparatuses have been put into practical use (refer to Unexamined Japanese Patent Application Publication No. 2006-058124, and Unexamined Japanese Patent Application Publication No. Hei 6(1994)-342099).

In the aforementioned radiation image capturing apparatus, a plurality of radiation detection elements 7 are normally arranged in a two-dimensional array (matrix) on a detecting section P, and each radiation detection element 7 is connected with the switch unit formed of a thin film transistor (hereinafter referred to as "TFT") 8, as shown in FIG. 6 to be described later. The on-voltage or off-voltage is applied to the scanning line 5 from the gate driver 15b of the scanning drive unit 15 so that the on/off operation of each TFT 8 is performed. Then the electric charge is stored into each radiation detection element 7, or is discharged from each radiation detection element 7 to each signal line 6.

Incidentally, a radiation image is formed by application of radiation to the radiation image capturing apparatus from the radiation source of a radiation generation device through a subject. For example, if a radiation image capturing apparatus and radiation generation device are produced by the same manufacturer, it is possible to design such a structure that an image can be captured while a signal or information is exchanged between the radiation image capturing apparatus and radiation generation device.

However, if a radiation image capturing apparatus and radiation generation device are produced by different manufacturers, a signal or information may not be exchanged between the radiation image capturing apparatus and radiation generation device in some cases. In this case, the radiation image capturing apparatus is required to make sure that radiation has been applied by itself.

To solve this problem, in recent years, it has been known that development of various radiation image capturing apparatuses capable of self-detection of the application of radiation, independently of the aforementioned interface configured between the radiation image capturing apparatus and radiation generation device.

For example, according to the Specification of the U.S. Pat. No. 7,211,803 and the Unexamined Japanese Patent Application Publication No. 2009-219538, when exposure of the radiation image capturing apparatus to radiation has started, and electric charge has been generated inside each radiation detection element 7, electric charge flows from each radiation detection element 7 to the bias line 9 (refer to FIG. 6 to be described later) connected to each radiation detection element 7, with the result that there is an increase in the volume of current running through the bias line 9. It is proposed that to utilize this phenomenon effectively, the bias line 9 is provided with a current detection unit to detect the value of the current flowing through the bias line 9 and that thus, the start of irradiation is detected based on this current value.

According to the research made by the present inventors, however, it has been found out that since the aforementioned technique uses a bias line 9 connected to the electrode of each radiation detection element 7, noise generated by the current detection unit is transmitted to each radiation detection element 7 through the bias line 9, and is superimposed on the image data D read out of the radiation detection element 7 in some cases and that solution to the problem is not easy.

In the meantime, after extended research on an alternative method that enables the start of irradiation to be detected by the radiation image capturing apparatus, the present inventors have found out several techniques that enable the radiation image capturing apparatus to detect the start of irradiation appropriately by itself.

Incidentally, as will be described later, in one of the procedures of detecting the start of irradiation, which have been found out by the present inventors, off-voltage is applied to each scanning line 5 from the scanning drive unit 15 prior to radiation image capturing. When each TFT 8 has been turned off, the reading circuit 17 is allowed to perform read-out operation. Thus, the leak data "d leak" is read out in such a way that the electric charge "q" (see FIG. 10 to be described later) having leaked out of the radiation detection element 7 through the TFT 8 is converted into the leak data "d leak".

When the radiation image capturing apparatus has been irradiated, the value of the leak data "d leak" to be read is increased. This is employed to detect the start of irradiation of the radiation image capturing apparatus, based on the value of the leak data "d leak" having been read out. In this case, if each TFT 8 is kept turned off, dark electric charge will be accumulated in each radiation detection element 7. Thus, as will be described later, the step of reading the leak data "d leak" and the step of resetting each radiation detection element 7 are repeated on an alternate basis.

In another procedure of detecting the start of irradiation found out by the present inventors, before the radiation image capturing operation, on-voltage is sequentially applied to each of lines L1 through Lx of the scanning line 5 from the scanning drive unit 15 so that image data "d" is read. In the following description, the image data for detecting the start of irradiation read out for detecting the start of irradiation prior to the above-mentioned radiation image capturing operation is referred to as image data "d", as distinguished from the image data D as a main image immediately after image capturing operation.

In this case as well, when the radiation image capturing apparatus is irradiated, there is a rise in the value of image data "d" to be read. This is utilized again to detect the start of irradiation of the radiation image capturing apparatus, based on the value of the image data "d" having been read out.

This structure is known to permit the radiation image capturing apparatus by itself to accurately detect irradiation based on values of the leak data "d leak" or image data "d" having been read out, even if an interface cannot be formed between the radiation image capturing apparatus and radiation generation device.

In the radiation image capturing apparatus, when the start of irradiation of the radiation image capturing apparatus has been detected in conformity to the above-mentioned procedure, off-voltage is applied to each scanning line 5 from the scanning drive unit 15 and each TFT 8 is turned off, and then the state transfers to the state of electric charge accumulation where the electric charge generated by irradiation is accumulated in each radiation detection element 7. After that, on-voltage is sequentially applied to each scanning line 5 from the scanning drive unit 15, thereby starting the step of reading the image data D as the main image from each radiation detection element 7.

In this case, in the state of electric charge accumulation where each TFT 8 is kept turned off, so-called dark electric charge is accumulated in each radiation detection element 7 at all times due to the thermal excitation caused by the heat (temperature) of the radiation detection element 7 itself. The offset resulting from this dark electric charge is superimposed on the image data D to be read out.

Thus, the step of reading the offset data O where the offset resulting from the dark electric charge is read out as offset data O is executed after the image data D as the main image has been read out, in many cases. Then the true image data D* is calculated by subtracting the offset data O having been read out from the image data D read out in the subsequent image processing step. This procedure ensures that the true image data D* is purely the data resulting from the electric charge generated by irradiation, without including the offset resulting from dark electric charge.

Incidentally, when the structure is so configured as to perform the step of reading the above-mentioned offset data O, various conditions are set up in such a way that the offset data O will be the value to accurately cancel the offset resulting from the dark electric charge superimposed on the image data D as the main image in the above-mentioned step of subtraction.

To be more specific, for example, after the image data D as the main image has been read, the image data D left without having been read out will remain in each radiation detection element 7. To solve this problem, for example, the step of resetting each radiation detection element 7 is repeated to remove the unread portion of the data subsequent to the step of reading the image data D. After that, the offset data O is read out.

However, when the above-mentioned new procedure of detecting the start of irradiation found out by the present inventors is adopted, it has been revealed that there may be a failure of offsetting, in some cases, between the offset resulting from the dark electric charge superimposed on the image data D as the main image and the offset data O, if the above-mentioned procedure of reading the offset data O that has been regarded as natural.

This will be described more specifically. The image capturing operation should be performed by irradiation of the radiation image capturing apparatus when a subject is present between the radiation source and radiation image capturing apparatus. However, for the sake of clarity, radiation is assumed to be applied uniformly to each radiation detection element 7 of the radiation image capturing apparatus without any subject.

To be more specific, on-voltage is sequentially applied to each of lines L1 through Lx of the scanning line 5 from the gate driver 15b of the scanning drive unit 15, without radiation applied to the radiation image capturing apparatus, as illustrated in FIG. 27. Then the image data "d" for detecting the start of irradiation is read out of each radiation detection element 7. Radiation is then uniformly applied to the radiation image capturing apparatus. The start of irradiation is assumed to be detected based on the image data "d" read out when the on-voltage is applied to the line Ln of the scanning line 5.

In this case, application of the on-voltage to each scanning line 5 from the gate driver 15b is suspended at that moment. The off-voltage is applied to each scanning line 5 so that there is a transfer to the state of electric charge accumulation. In this state of electric charge accumulation, the electric charge generated in each radiation detection element 7 by irradiation is accumulated in each radiation detection element 7.

After the state of electric charge accumulation has been maintained for a prescribed period of time, application of the on-voltage is resumed, for example, from the line Ln+1 of the scanning line 5. The on-voltage is sequentially applied to the lines Ln+1 through Lx and L1 through Ln of the scanning line 5, and the image data D as the main image is read out of each radiation detection element 7 connected to each scanning line 5.

To remove the image data which is left without having been read out and which still remains in each radiation detection element 7, on-voltage is sequentially applied to the lines Ln+1 through Lx and L1 through Ln of the scanning line 5 so that the step of resetting each radiation detection element 7 is repeated. After that, on-voltage is sequentially applied to the lines Ln+1 through Lx and L1 through Ln of the scanning line 5 to read out the image data "d" for detecting the start of irradiation. The equivalent step of resetting the each radiation detection element 7 can be executed, instead of reading the image data "d" for detecting the start of irradiation.

After that, the radiation image capturing apparatus is left to stand (wherein radiation is not applied in this case) for the same time duration as that for the above-mentioned state of electric charge accumulation while on-voltage is applied to each of lines L1 through Lx of the scanning line 5. Then, application of on-voltage is resumed from the line Ln+1 of the scanning line 5, so that on-voltage is sequentially applied to the lines Ln+1 through Lx and L1 through Ln of the scanning line 5. The offset data O is read out from each radiation detection element 7 connected to each scanning line 5.

If the above-mentioned test is conducted, the offset due to the dark electric charge superimposed to the image data D read out as the main image, and the offset data O having been read out thereafter should reach the same value for each radiation detection element 7. Accordingly, the true image data D* is calculated by subtraction of the offset data O from the image data D and this should provide offsetting between the offset superimposed on the image data D and offset data O. Thus, the true image data D* should be the same value for each radiation detection element 7.

In actual practice, however, as shown in FIG. 28, it has been revealed that there is a level difference in the true image data D* between the line Ln of the scanning line 5 which has detected the start of irradiation and the line Ln+1 of the scanning line 5 which has started reading of the image data D first. In FIG. 28, the magnitude of the true image data D* is represented in terms of contrast ratio. For easy viewing of the figure, the difference in the magnitude (contrast ratio) is emphasized.

The level difference in the true image data D* also appears when radiographic imaging operation is performed using a subject. As shown above, if the level difference occurs to the true image data D*, a streak will appear on the image portion corresponding to the level difference on the true image data D*, for example, when the radiation image captured by the radiation image capturing apparatus is used for diagnosis in medical treatment. This will cause a viewing difficulty. Further, if this streaked image portion and the lesion of the patient are overlapped with each other on the radiation image, viewing difficulty of the lesion will arise, with the result that the lesion may be overlooked.

SUMMARY

In view of the problems described above, it is an object of the present invention to provide a radiation image capturing apparatus capable of ensuring that a radiation image capturing apparatus itself accurately detects irradiation and appropriately prevents a level difference from occurring to the true image data D*.

To solve at least one of the above-mentioned problems, a radiation image capturing apparatus reflecting one aspect of the present invention includes:

a detecting section including:
a plurality of scanning lines and a plurality of signal lines provided to cross each other; and
a plurality of radiation detection elements arranged in a two-dimensional array in small regions partitioned by the plurality of scanning lines and the plurality of signal lines;
a scanning drive unit which applies on-voltage or off-voltage to each of the scanning lines;
switch units each connected to each of the scanning lines so as to discharge electric charge accumulated in the radiation detection elements to the signal lines when the on-voltage is applied;
a reading circuit for converting the electric charge discharged from the radiation detection elements, into image data to read the image data; and
a control device for controlling at least the scanning drive unit and the reading circuit to perform processing of reading the image data from the radiation detection elements,
wherein the control device is configured to, prior to radiation image capturing operation, alternately execute processing of reading leak data and processing of resetting each of the radiation detection elements,
wherein the control device performs the processing of reading the leak data by converting the electric charge having leaked from the radiation detection elements through the switch units into the leak data, after allowing the scanning drive unit to apply off-voltage to each of the scanning lines so that each of the switch units is turned off, and performs the processing of resetting each of the radiation detection elements by allowing the scanning drive unit to sequentially apply on-voltage to each of the scanning lines, wherein the control device, when detecting a start of irradiation when the read leak data exceeds a threshold value, allows the scanning drive unit to apply the off-voltage to each of the scanning lines so as to conduct transfer to a state of an electric charge accumulation so that the electric charge generated by the irradiation is accumulated in each of the radiation detection elements, and the control device performs the processing of reading the image data from each of the radiation detection elements after the transfer to the state of electric charge accumulation, and wherein the control device, after the processing of reading the image data, executes the processing of reading the leak data and the processing of resetting each of the radiation detection elements alternately, with a same cycle as the processing of reading the leak data and the processing of resetting each of the radiation detection elements which have been performed prior to detecting the start of irradiation, and the control device allows the scanning drive unit to apply the off-voltage to each of the scanning lines for a same time period as the state of electric charge accumulation, and then performs the processing of reading the offset data from each of the radiation detection elements with a same cycle as the processing of reading the image data.

A radiation image capturing apparatus as another embodiment of the present invention includes;

a detecting section including:
a plurality of scanning lines and a plurality of signal lines provided to cross each other, and
a plurality of radiation detection elements arranged in a two-dimensional array in small regions partitioned by the plurality of scanning lines and the plurality of signal lines;
a scanning drive unit which applies on-voltage or off-voltage to each of the scanning lines;
switch units each connected to each of the scanning lines so as to discharge electric charge accumulated in the radiation detection elements to the signal lines when the on-voltage is applied;
a reading circuit for converting the electric charge discharged from the radiation detection elements, into image data to read the image data; and
a control device for controlling at least the scanning drive unit and the reading circuit to perform processing of reading the image data from the radiation detection elements,
wherein the control device, prior to radiation image capturing operation, allows the scanning drive unit to apply the on-voltage sequentially to each of the scanning lines, and executes the processing of reading the image data for detecting a start of irradiation,
wherein the control device, when detecting the start of irradiation when the read image data exceeds a threshold value, allows the scanning drive unit to apply the off-voltage to each of the scanning lines so as to conduct transfer to a state of electric charge accumulation so that the electric charge generated by the irradiation is accumulated in each of the radiation detection elements, and the control device executes the processing of reading the image data as a main image from each of the radiation detection elements after the transfer to the state of electric charge accumulation, and wherein the control device, after the processing of reading the image data as the main image, executes the processing of reading the image data with a same cycle as the processing of reading the image data for detecting the start of irradiation which has been performed prior to detecting the start of irradiation, and the control device allows the scanning drive unit to apply the off-voltage to each of the scanning lines for a same time period as the state of electric charge accumulation, and then performs the processing of reading the offset data from each of the radiation detection elements with a same cycle as the processing of reading the image data as the main image.

DETAILED DESCRIPTION OF THE PREFERRED EMBODIMENT

The following describes the embodiments of the radiation image capturing apparatus in the present invention with reference to the drawings.

The following describes a so-called indirect radiation image capturing apparatus that is provided with a scintillator or the like as a radiation image capturing apparatus, wherein the applied radiation is converted into electromagnetic waves of other wavelengths such as visible light, whereby an electric signal is obtained. However; the present invention is also applicable to the so-called direct type radiation image capturing apparatus that detects radiation directly by a radiation detection element without using a scintillator or others.

The present invention can be used for a fixed type which formed integrally with a support base for example (also called as an exclusive type) as well as a so-called portable radiation image capturing apparatus which will be described as an embodiment.

Figure 1:
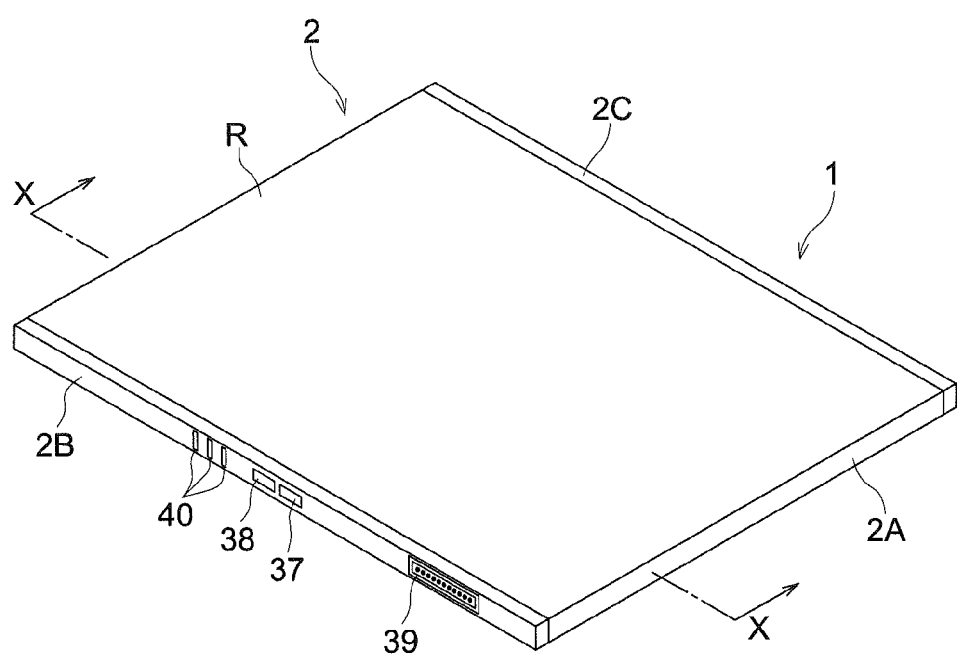
FIG. 1 is a perspective view representing the external appearance of a radiation image capturing apparatus of the present embodiment.
Figure 2:
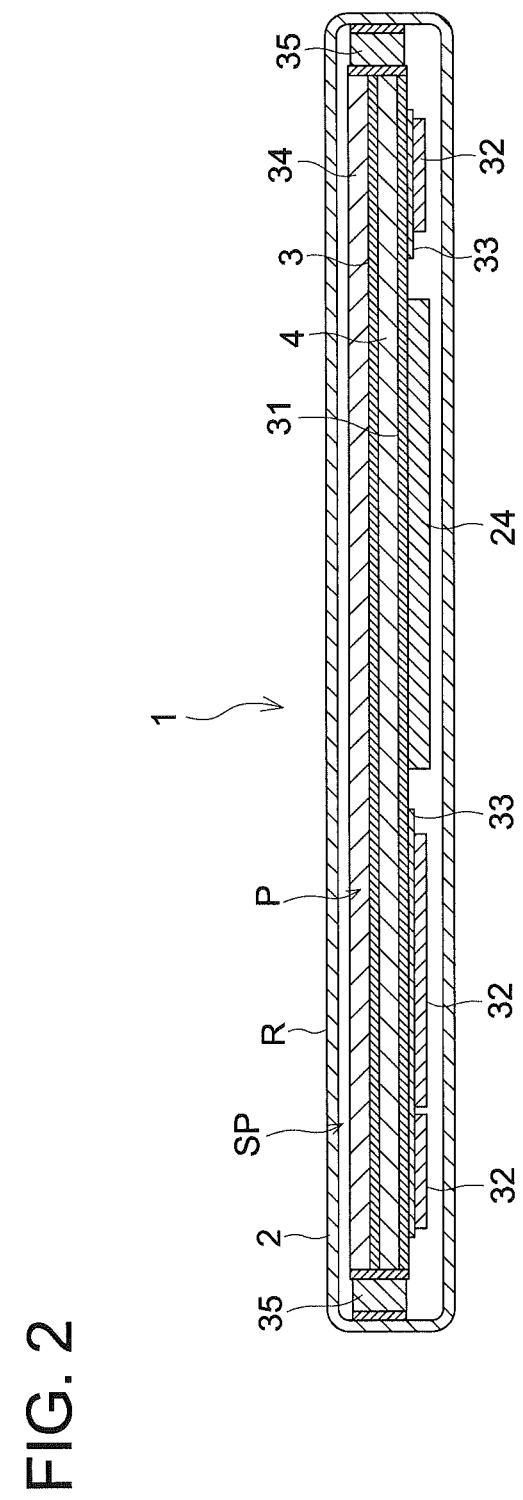
FIG. 2 is a cross section taken along arrow line X-X in FIG. 1.

FIG. 1 is a perspective view representing the external appearance of a radiation image capturing apparatus of the present embodiment. FIG. 2 is a cross section taken along arrow line X-X in FIG. 1. In the radiation image capturing apparatus 1 of the present embodiment, as shown in FIGS. 1 and 2, a sensor panel SP composed of a scintillator 3 and substrate 4 are incorporated in a casing-shaped housing 2.

In the present embodiment, in the casing 2, a hollow rectangular sleeve-shaped housing main body 2A having a radiation incidence surface R is made of such a material as a carbon board and plastics that allows passage of radiation. The casing 2 is formed by blocking the openings on both sides of the housing main body 2A with cover members 2B and 2C.

Further, the cover member 2B on one side of the casing 2 is provided with a power switch 37, change-over switch 38, connector 39, and indicator 40 composed of a LED or the like for indicating the battery status and operating conditions of the radiation image capturing apparatus 1.

Though, not illustrated, in the present invention, a connecter 39 can be connected with a connecter provided on the end of a cable. By connecting with the cable, signals can be exchanged with a consol not illustrated or image data D can be sent to the consol. Further, although not illustrated, an antenna device 41 refer to (FIG. 6, to be described later) is installed on the cover member 2C and others on the opposite side of the casing 2 so as to be embedded into the cover member 2C and others. In the present embodiment, this antenna device 41 serves as a communication unit for wireless exchange of signals and others, for example, between the radiation image capturing apparatus 1 and console or others. Inside the casing 2, as shown in FIG. 2, the substrate 4 is arranged above a base 31 through a thin lead plate (not illustrated) and others. The base 31 is provided with a PCB 33 equipped with electronic parts 32 and others, and a battery 24. Further, the radiation incidence surfaces R of the substrate 4 and scintillator 3 are provided with glass substrates 34 for protection. Further, in the present embodiment, a cushioning material 35 is provided between lateral sides of the base 31 and substrate 4 and casing 2 to prevent mutual collision.

The scintillator 3 is installed opposed to the detecting section P (to be described later) of the substrate 4. In the present embodiment, the scintillator 3 is mainly composed of a phospher, for example. Upon receipt of radiation, the scintillator 3 converts the radiation into an electromagnetic wave having a wavelength of 300 through 800 nm, i.e., an electromagnetic wave mainly consisting of visible light and outputs this electromagnetic wave.

Figure 3:
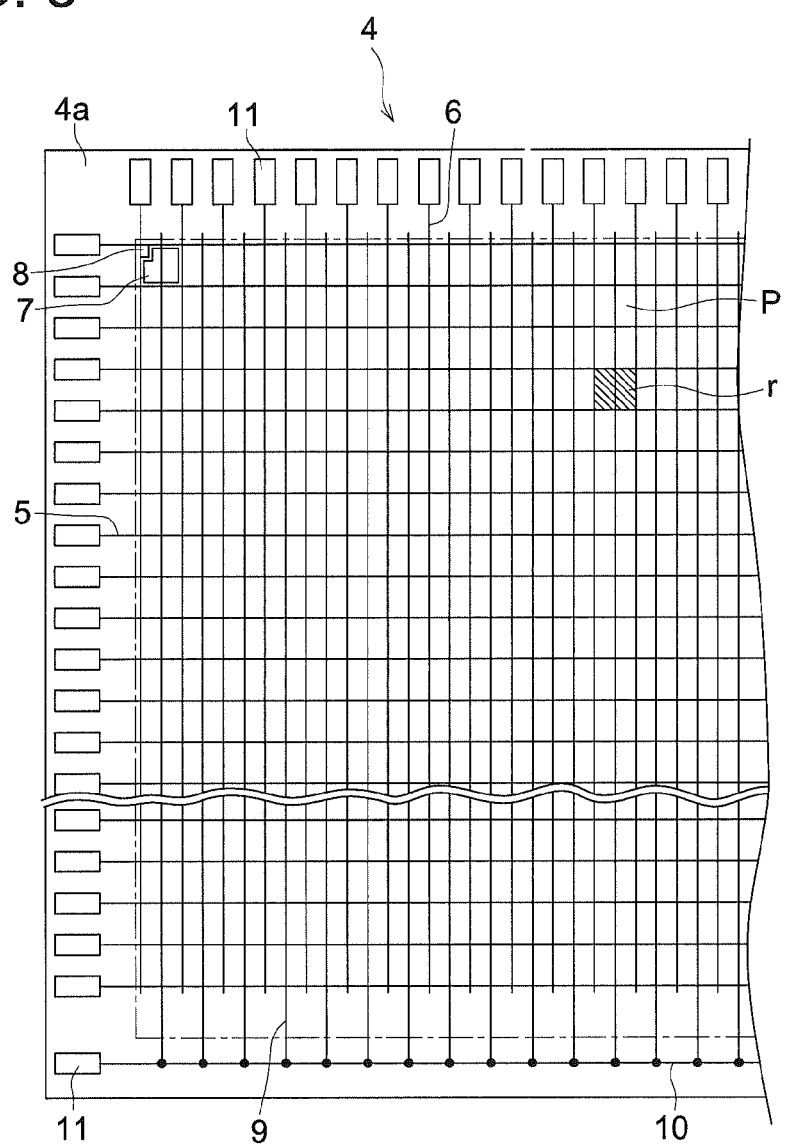
FIG. 3 is a plan view showing the structure of the substrate of the radiation image capturing apparatus.

In the present embodiment, the substrate 4 is formed of a glass substrate. As shown in FIG. 3, a plurality of scanning lines 5 and a plurality of signal lines 6 are arranged on the surface 4a of the substrate 4 on the side opposed to the scintillator 3 so as to cross each other. A radiation detection element 7 is provided in each of the small regions "r" partitioned by a plurality of scanning lines 5 and a plurality of signal lines 6 on the surface 4a of the substrate 4. As described above, the detecting section P is defined as all of the small regions "r", which are partitioned by scanning lines 5 and signal lines 6 and provided with a plurality of radiation detection elements 7 in a two-dimensional array i.e., the entire region indicated by the one-dot chain line in FIG. 3.

Figure 4:
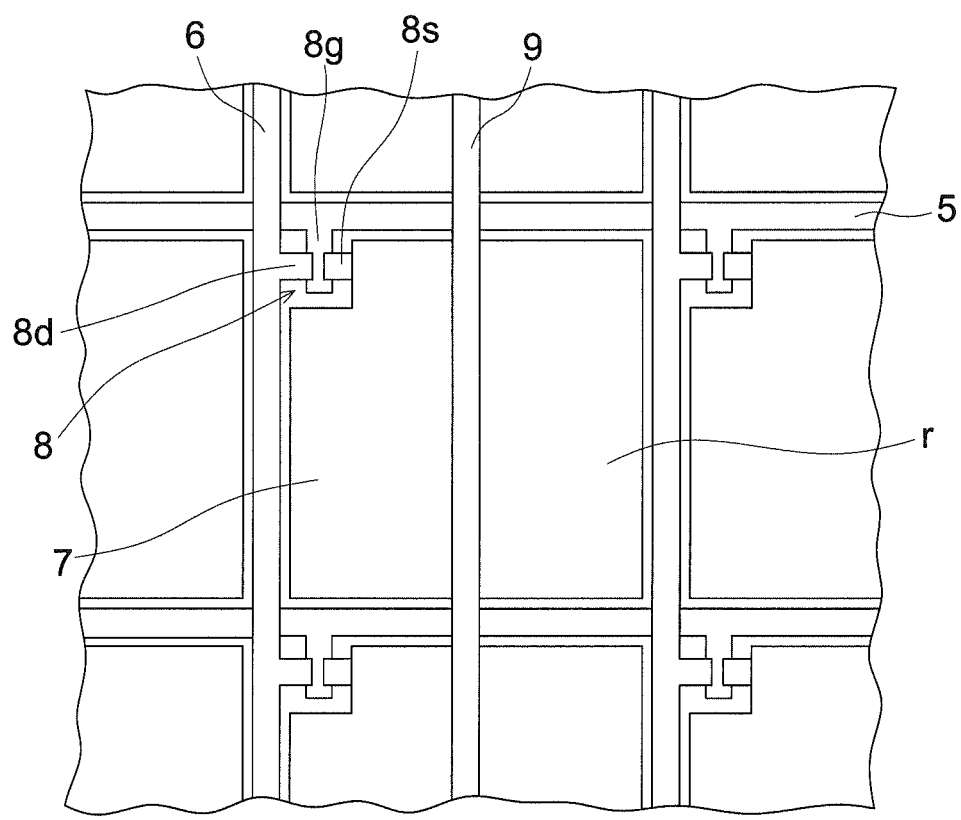
FIG. 4 is an enlarged view showing the structure of the radiation detection elements, TFTs and others formed on the small region on the substrate in FIG. 3.

In the present embodiment, a photodiode is used as the radiation detection element 7. It is also possible to use a phototransistor, for example. Each radiation detection element 7 is connected to the source electrode 8s of the TFT 8 which is a switch unit as shown in FIG. 4 as an enlarged view of FIG. 3. The drain electrode 8d of the TFT 8 is connected to the signal line 6.

Radiation enters the radiation detection element 7 from the radiation incidence surface R of the casing 2 of the radiation image capturing apparatus 1. An electron-hole pair is produced inside when exposed to the electromagnetic wave such as visible light obtained by conversion from the radiation by the scintillator 3. The radiation detection element 7 converts the applied radiation (electromagnetic wave obtained by conversion from radiation by the scintillator 3 in the present embodiment) into electric charges.

The TFT 8 is turned on when on-voltage is applied to the gate electrode 8g from the scanning drive unit 15 (to be described later) through the scanning line 5. Electric charges stored in the radiation detection element 7 are discharged to the signal line 6 through the source electrode 8s and drain electrode 8d. Further, the TFT 8 is turned off when off-voltage is applied to the gate electrode 8g through the connected scanning line 5. This suspends discharge of electric charges from the radiation detection element 7 to the signal line 6 so that electric charges are accumulated inside the radiation detection element 7.

In the present embodiment, one bias line 9 is connected to a plurality of radiation detection elements 7 arranged in rows, as shown in FIG. 4. As illustrated in FIG. 3, each bias line 9 is provided parallel to the signal line 6. Bias lines 9 are united by the wiring 10 outside the detecting section P of the substrate 4.

In the present embodiment, each scanning line 5, signal line 6 and the wiring 10 of bias line 9 is connected to the input/output terminal (also called a pad) 11 provided close to the edge of the substrate 4, as shown in FIG. 3.

Figure 5:
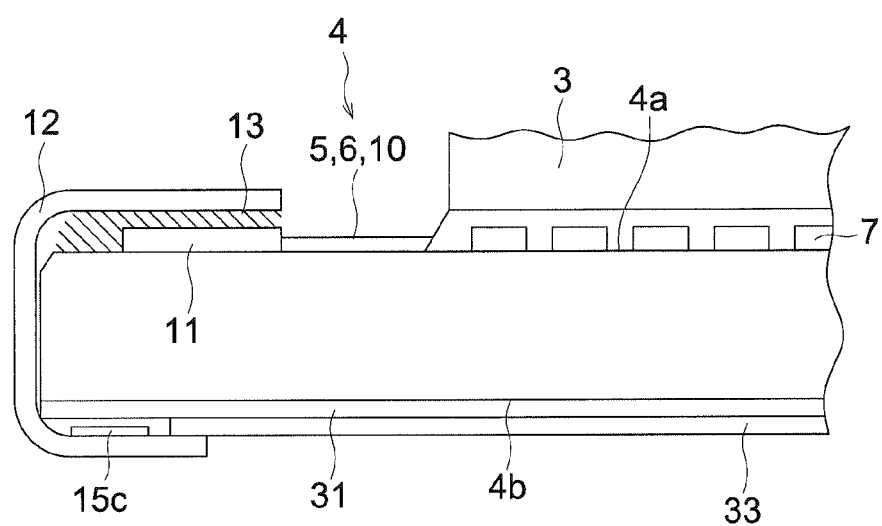
FIG. 5 is a side view showing the substrate on which a flexible circuit substrate and PCB are installed.

As shown in FIG. 5, each input/output terminal 11 is connected with a flexible circuit substrate (also-called a Chip On Film) 12, wherein the chip of the gate IC 15c and others constituting the gate driver 15b of the scanning drive unit 15 (to be described later) are built on the film, through such an anisotropic conductive adhesive agent 13 as an anisotropic conductive film and anisotropic conductive paste.

The flexible circuit substrate 12 is routed to the reverse side 4b of the substrate 4, and is connected with the aforementioned PCB 33 on the reverse side 4b. The sensor panel SP of the radiation image capturing apparatus 1 is formed in this manlier. It should be noted that electronic parts 32 are not illustrated in FIG. 5.

Figure 6:
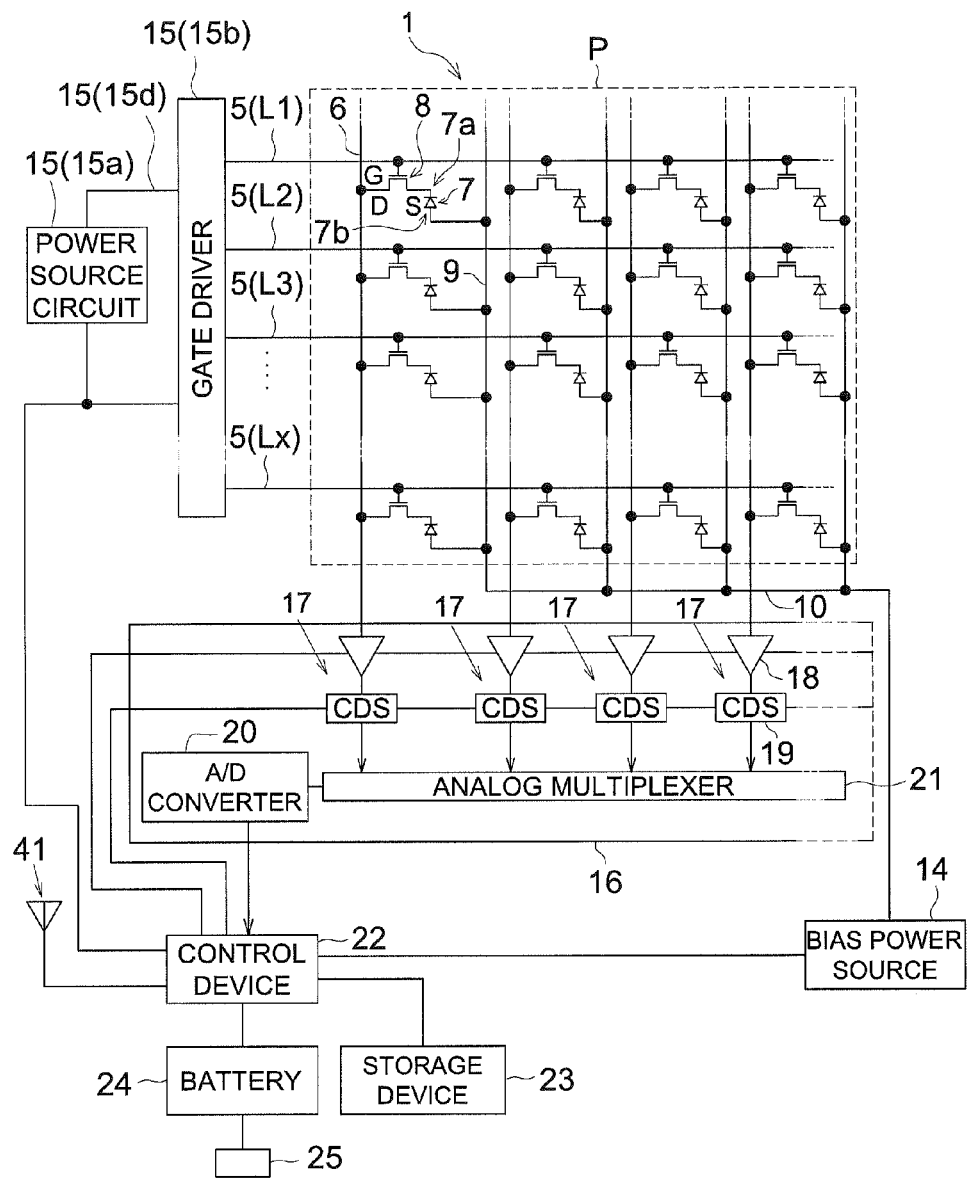
FIG. 6 is a block diagram showing the equivalent circuit of the radiation image capturing apparatus.
Figure 7:
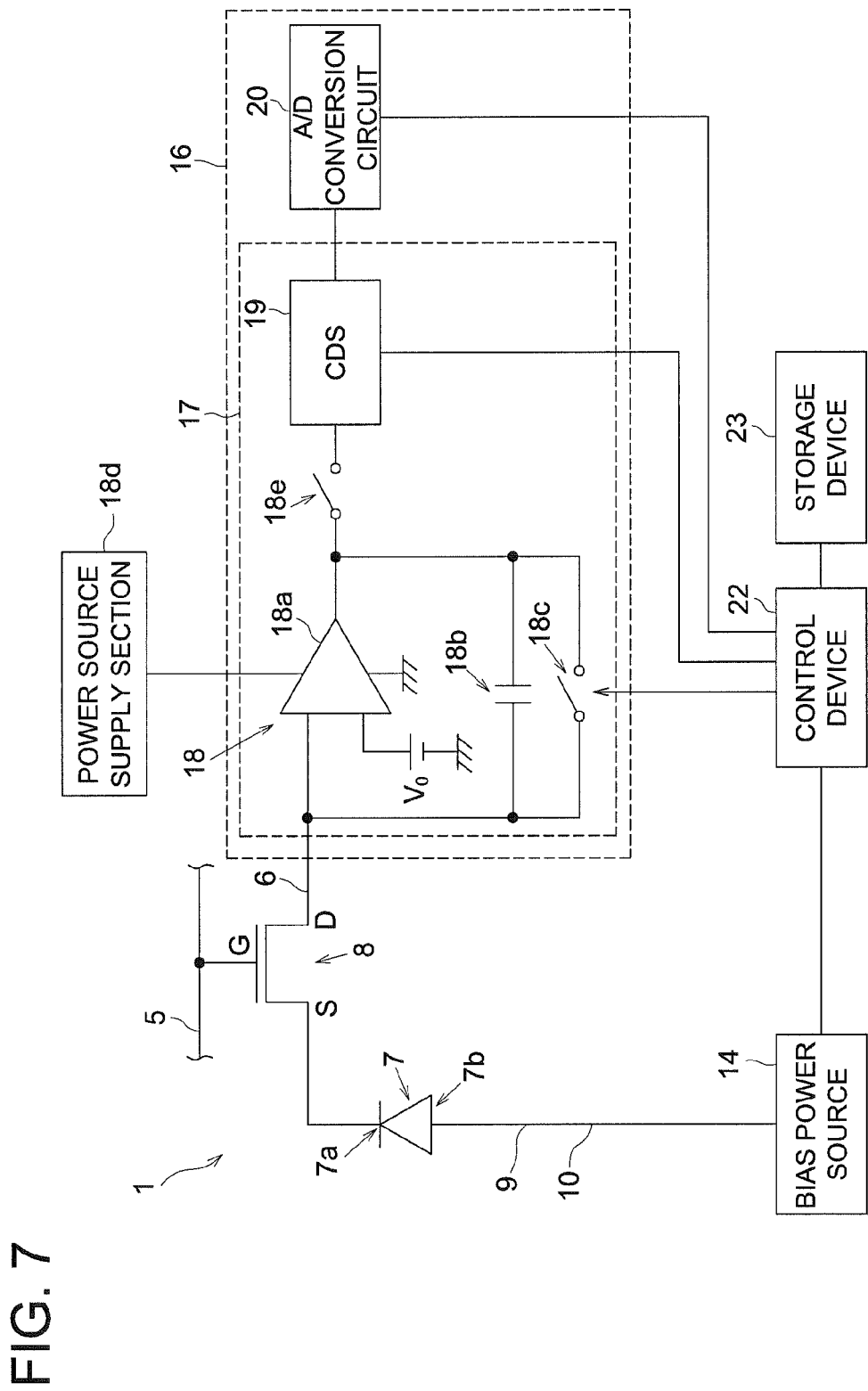
FIG. 7 is a block diagram showing the equivalent circuit for one pixel constituting the detecting section.

The following describes the structure of the circuit of the radiation image capturing apparatus 1. FIG. 6 is a block diagram showing the equivalent circuit of the radiation image capturing apparatus 1. FIG. 7 is a block diagram showing the equivalent circuit for one pixel constituting the detecting section P.

As described above, in each radiation detection element 7 of the detecting section P of the substrate 4, a bias line 9 is connected to each of the second electrodes 7b. Bias lines 9 are united by the wiring 10, and are connected to the bias power source 14. The bias power source 14 applies bias voltage to the second electrode 7b of each radiation detection element 7 through the wiring 10 and each of bias lines 9. Further, the bias power source 14 is connected to the control device 22 (to be described later) so as to control the bias voltage to be applied to each radiation detection element 7 from the bias power source 14 by the control device 22.

As shown in FIGS. 6 and 7, in the present embodiment, voltage (so-called inverse bias voltage) equal to or less than the voltage applied to the first electrode 7a of the radiation detection element 7 is applied from the bias power source 14 as bias voltage to the second electrode 7b of the radiation detection element 7 through the bias line 9.

The scanning drive unit 15 is provided with a power source circuit 15a for supplying on-voltage and off-voltage to the gate driver 15b through the wiring 15d, and a gate driver 15b for switching between on-voltage and off-voltage to be applied to each of the lines L1 through Lx of the scanning line 5 so that the on/off state of each of the TFTs 8 is switched.

As shown in FIGS. 6 and 7, the signal lines 6 are connected to the reading circuits 17 incorporated in the reading IC 16, respectively. The reading circuit 17 includes an amplification circuit 18 and correlated dual sampling circuit 19. The reading IC 16 further incorporates an analog multiplexer 21 and A/D conversion circuit 20. It should be noted that, in FIG. 6 and FIG. 7, the correlated dual sampling circuit 19 is represented as CDS. Further, in FIG. 7, the analog multiplexer 21 is not illustrated.

In the present embodiment, the amplification circuit 18 includes operation amplifier 18a, the capacitor 18b and charge reset switch 18c connected parallel to the operation amplifier 18a and a charge amplifier circuit equipped with a power source supply section 18d for supplying power to the operation amplifier 18a and others. A signal line 6 is connected to the reverse input terminal on the input side of the operation amplifier 18a of the amplification circuit 18. A base potential $V_0$ is applied to the non-reverse input terminal on the input side of the amplification circuit 18. It should be noted that the base potential $V_0$ is set to an appropriate value. In the present embodiment, a base potential $V_0$ of 0 volt is applied, for example.

Further, the charge reset switch 18c of the amplification circuit 18 is connected to the control device 22, and is placed under the on/off control by the control device 22. Further, a switch 18e that switches synchronous with the charge reset switch 18c is installed between the operation amplifier 18a and correlated dual sampling circuit 19. The switch 18e is turned on or off synchronous with the on-off operation of the charge reset switch 18c.

Figure 8:
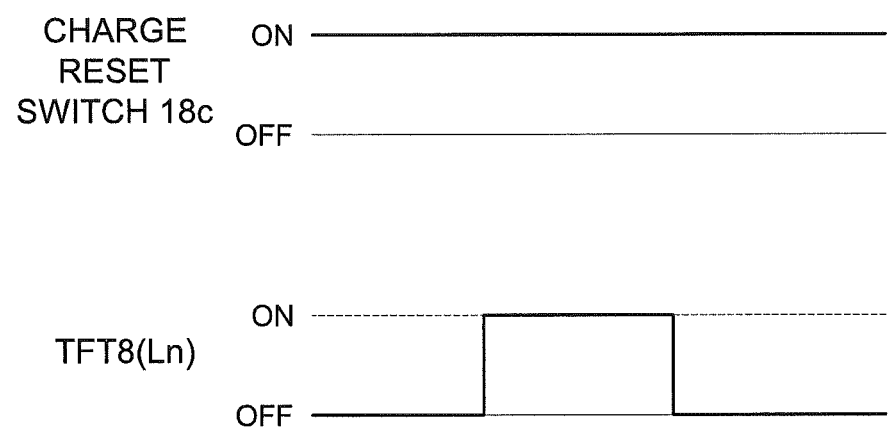
FIG. 8 is a timing chart showing the on-off timing for the charge reset switch and TFT in the step of resetting each radiation detection element.

When performing the step of resetting each radiation detection element 7 to remove electric charges remaining in each radiation detection element 7 in the radiation image capturing apparatus 1, each of TFT 8 is turned on while the charge reset switch 18c is kept turned on (and the switch 18e is turned off), as shown in FIG. 8.

Then electric charge is discharged to the signal line 6 from each radiation detection element 7 through each of the TFTs 8. Passing through the charge reset switch 18c of the amplification circuit 18, the electric charge flows through the operation amplifier 18a from the output terminal side of the operation amplifier 18a and comes out of the non-reverse input terminal to the ground, or flows out to the power source supply section 18d. In this manner, each radiation detection element 7 is subjected to resetting processing.

Figure 9:
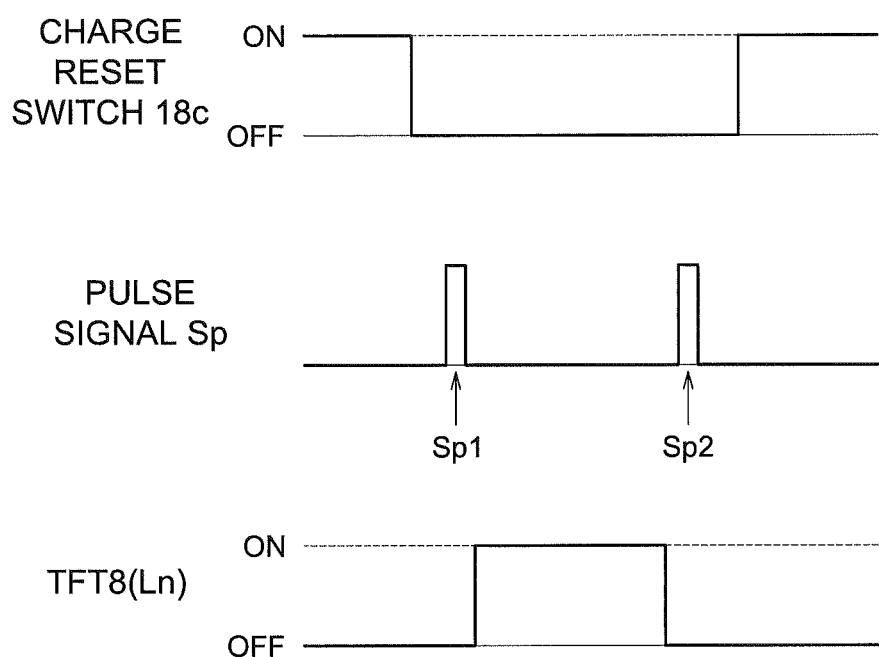
FIG. 9 is a timing chart showing the on-off timing of the charge reset switch, pulse signal and TFT in the step of reading the image data.

At the time of reading of image data D as the main image from each radiation detection element 7 or reading of image data "d" for detecting the start of irradiation to be described later, the electric charge is discharged to the signal line 6 from each radiation detection element 7 through each of the TFTs 8 being turned on, while the charge reset switch 18c of the amplification circuit 18 is kept turned off (and switch 18e kept turned on), as shown in FIG. 9. Then the electric charge is accumulated in the capacitor 18b of the amplification circuit 18.

In the amplification circuit 18, the voltage value in conformity to the amount of the electric charge accumulated in the capacitor 18b is outputted from the output side of the operation amplifier 18a. When the pulse signal Sp1 (FIG. 9) has been sent from the control device 22 before the electric charge flows out of each radiation detection element 7, the correlated dual sampling circuit (CDS) 19 retains the voltage value Vin outputted from the amplification circuit 18 at this moment.

When a pulse signal Sp2 is sent from the control device 22 after the electric charge having flown out of the each radiation detection element 7 has been accumulated in the capacitor 18b of the amplification circuit 18, the correlated dual sampling circuit (CDS) 19 retains the voltage value Vfi outputted from the amplification circuit 18 at this moment. The correlated dual sampling circuit 19 calculates the difference Vfi−Vin of the voltage value, and outputs the calculated difference Vfi−Vin downstream as image data D of the analog value.

The image data D of each radiation detection element 7 outputted from the correlated dual sampling circuit 19 is sequentially sent to the A/D conversion circuit 20 through the analog multiplexer 21. After having been converted to the image data D of digital value sequentially by the A/D conversion circuit 20, the image data D is outputted to the storage device 23 and is stored sequentially.

Upon completion of reading of the first image data D, charge reset switch 18c of the amplification circuit 18 is turned on (FIG. 9), and the electric charge accumulated in the capacitor 18b is discharged. Similarly to the above, the discharged electric charge passes through the operation amplifier 18a from the output terminal side of the operation amplifier 18a and comes out of the non-reverse input terminal to enter the ground or flows out into the power source supply section 18d. Then the amplification circuit 18 is reset.

The control device 22 includes the unillustrated CPU (Central Processing Unit), ROM (Read Only Memory), RAM (Random Access Memory), computer connected with an input/output interface through a bus, and FPGA (Field Programmable Gate Array). The control device 22 can be formed of an exclusive control circuit The control device 22 controls the operation of each component members of the radiation image capturing apparatus 1. Further, as shown in FIG. 6, the control device 22 is connected with the storage device 23 including a SRAM (Static RAM), SDRAM (Synchronous DRAM) and others.

In the present embodiment, the control device 22 is connected with the aforementioned antenna device 41, and a battery 24 for supplying power to the components such as a detecting section P, scanning drive unit 15, reading circuit 17, storage device 23, and a bias power source 14. The battery 24 is provided with a connection terminal 25 for recharging the battery 24 by supplying the power to the battery 24 from a charging device (not illustrated).

As described above, the control device 22 controls the operation of the functioning components of the radiation image capturing apparatus 1, for example, by controlling the bias power source 14 to set or adjust the bias voltage applied to each radiation detection element 7 from the bias power source 14.

[Structure for Detecting the Start of Irradiation]

Next, a basic structure for the detection step to realize a new detection method of radiation irradiation start which the present inventors have found on the radiation image capturing apparatus 1 related to the embodiment will be described.

In the present embodiment, the interface between the radiation image capturing apparatus 1 and a radiation generation device (not illustrated) is not built and the radiation image capturing apparatus 1 itself detects irradiation. The following describes a detection method of an irradiation start performed on the radiation image capturing apparatus 1 related to the present embodiment.

The detection method in the present embodiment has been newly found out in the research and development efforts made by the present inventors. This is different from the method described in the Specification of the aforementioned U.S. Pat. No. 7,211,803 or the Unexamined Japanese Patent Application Publication No. 2009-219538, wherein a current detection unit is provided in the system, and the start of irradiation is detected based on the output value from the current detection unit. Either one of the following two detection methods can be adopted as the new detection method found out in the research and development efforts made by the present inventors.

[Detection Method 1]

Figure 10:
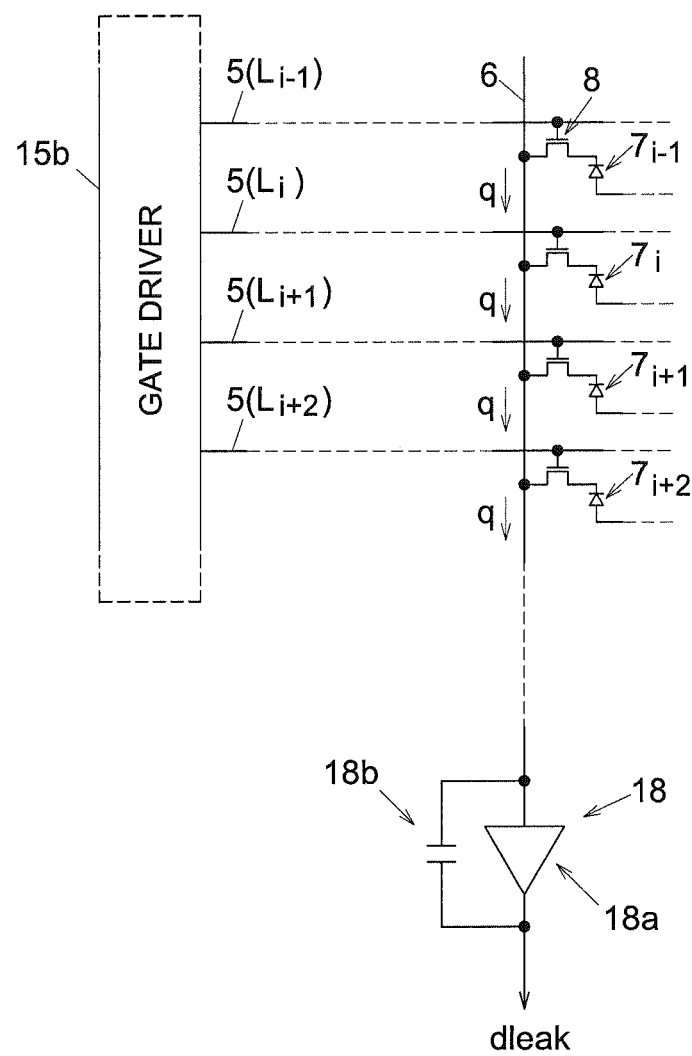
FIG. 10 is a diagram showing how the electric charge leaking from the radiation detection element through the TFT is read out as leak data.

For example, the radiation image capturing can be designed in such a way that the reading of leak data "d leak" is repeatedly performed before the radiation image capturing apparatus 1 is exposed to radiation. The leak data "d leak" is the data corresponding to the total value for each signal line 6 of the electric charge "q" leaking from each radiation detection element 7 through each of the TFTs 8 which is turned off with off-voltage applied to each scanning line 5, as shown in FIG. 10.

Figure 11:
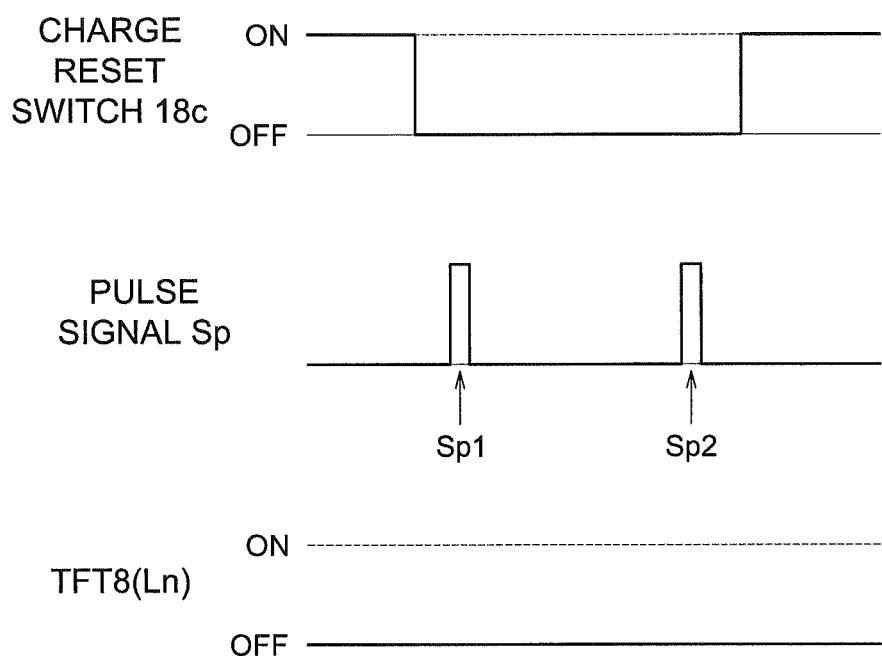
FIG. 11 is a timing chart showing the on-off timing of the charge reset switch and TFT in the step of reading the leak data

In the step of reading the leak data "d leak", differently from the step of image data D reading in FIG. 9, off-voltage is applied to each of the lines L1 through Lx of the scanning line 5 so that each of the TFTs 8 is turned off, as shown in FIG. 11. Under this condition, pulse signals Sp1 and Sp2 are sent from the control device 22 to the correlated dual sampling circuit 19 (CDS of FIGS. 6 and 7) of each reading circuit 17.

When pulse signal Sp1 has been sent from the control device 22, the correlated dual sampling circuit 19 retains the voltage value Vin outputted from the amplification circuit 18 at this moment. The electric charge "q" leaking from each radiation detection element 7 is accumulated in the capacitor 18b of the amplification circuit 18 through each of the TFTs 8, and the voltage value outputted from the amplification circuit 18 is increased. When the pulse signal Sp2 has been sent from the control device 22, the correlated dual sampling circuit 19 retains the voltage value Vfi outputted from the amplification circuit 18 at this moment.

The value outputted by calculation of the difference Vfi−Vin of the voltage value by the correlated dual sampling circuit 19 is used as leak data "d leak". After that, the conversion of the leak data "d leak" into the digital value by the A/D conversion circuit 20 or the like, is similar to the step of the aforementioned reading of image data D.

However, if the configuration is so designed that only the step of reading the leak data "d leak" is repeated, each of the TFTs 8 remains turned off, and the dark charge occurred in each radiation detection element 7 continues to be accumulated in each radiation detection element 7.

Figure 12:
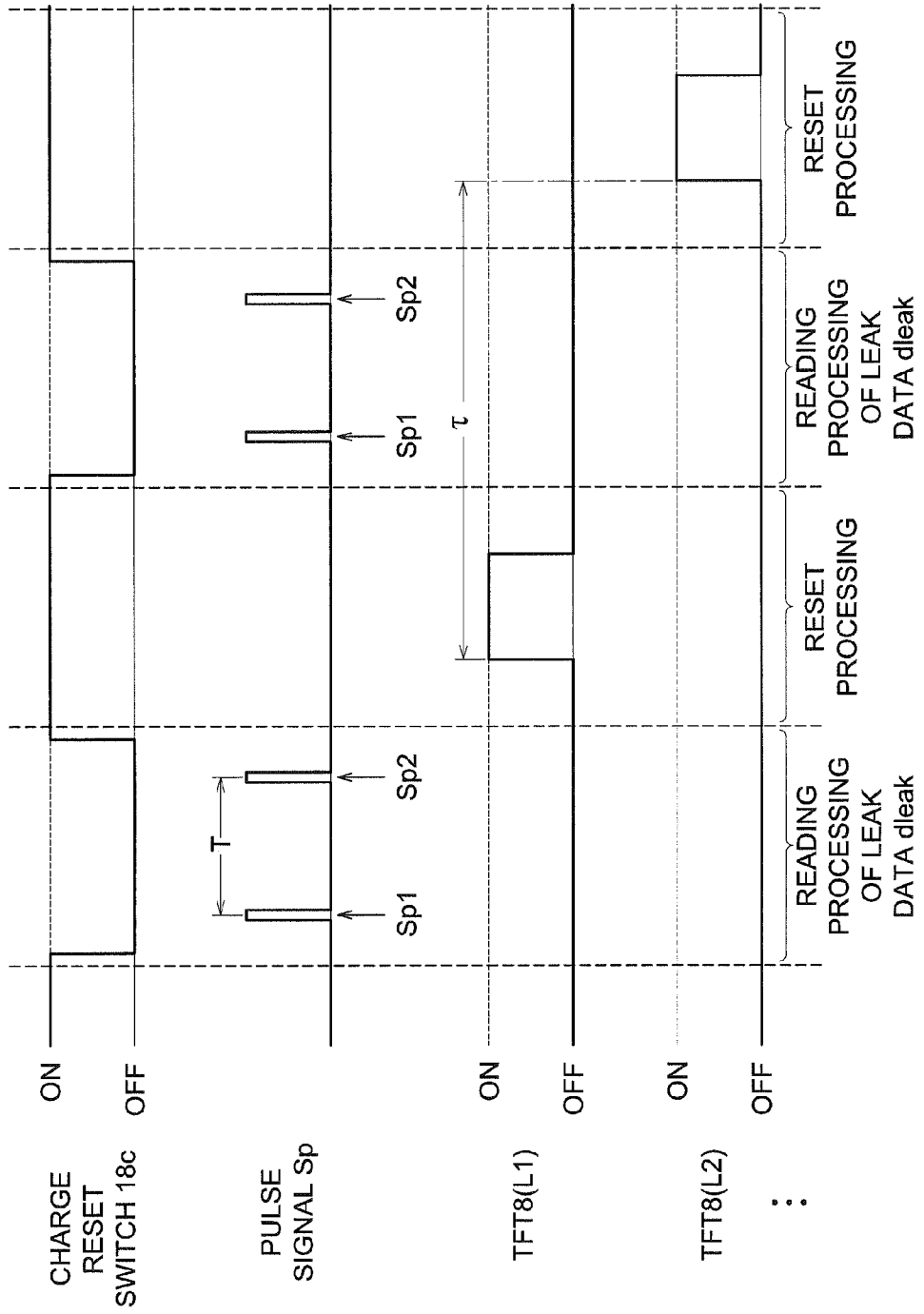
FIG. 12 is a timing chart showing the on-off timing of the charge reset switch, pulse signal and TFT when a step of reading the leak data and step of resetting each radiation detection element are performed on an alternate basis prior to radiation image capturing.

The detection method 1 preferably includes alternate performance of the step of reading the leak data "d leak" to be performed with the off-voltage applied to each scanning line 5, and the step of resetting the radiation detection element 7 to be performed with the on-voltage applied sequentially to each of the lines L1 through Lx of the scanning line 5, as shown in FIG. 12. T and t in FIGS. 12 and 13 will be described later.

Hereinafter, the step of resetting each radiation detection element 7 carried out with the step of reading the leak data "d leak" in on an alternate basis is called "the step of resetting each radiation detection element 7 carried out alternately with the step of reading the leak data "d leak"" and on the other hand, as described later in FIG. 15, the regular step of resetting each radiation detection element 7 carried out by sequentially applying on-voltage to each line L1 to Lx of the scanning line 5 without the step of reading the leak data "d leak" is called "the regular step of resetting each radiation detection element 7" or "the step of resetting each radiation detection element 7 without the step of reading the leak data "d leak"". In the present embodiment, the steps of resetting each radiation detection element are described separately as described above.

As described above, if the configuration is so designed that the step of reading the leak data "d leak" and the step of resetting each radiation detection element 7 are performed on an alternate basis prior to radiation image capturing operation, the electromagnetic wave created by conversion from radiation by the scintillator 3 (FIG. 2) is applied to each of the TFTs 8, when the irradiation of the radiation image capturing apparatus 1 is started. This results in an increase in the volume of electric charge "q" (FIG. 10) leaking from each radiation detection element 7 through each of the TFTs 8, which was revealed by the research and development efforts of the present inventors.

Figure 13:
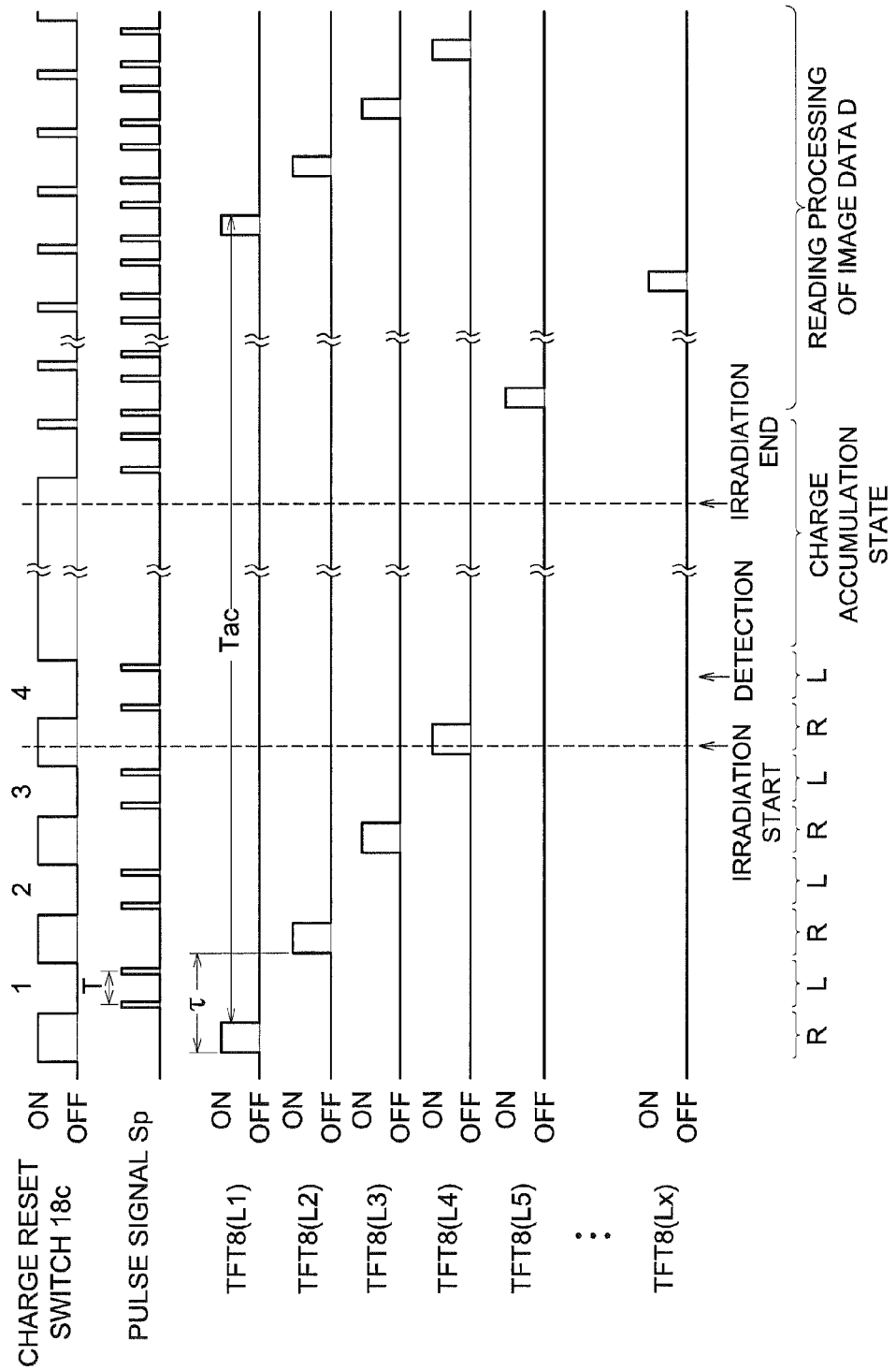
FIG. 13 is a timing chart showing the timing for applying on-voltage to each scanning line in the detection method 1.
Figure 14:
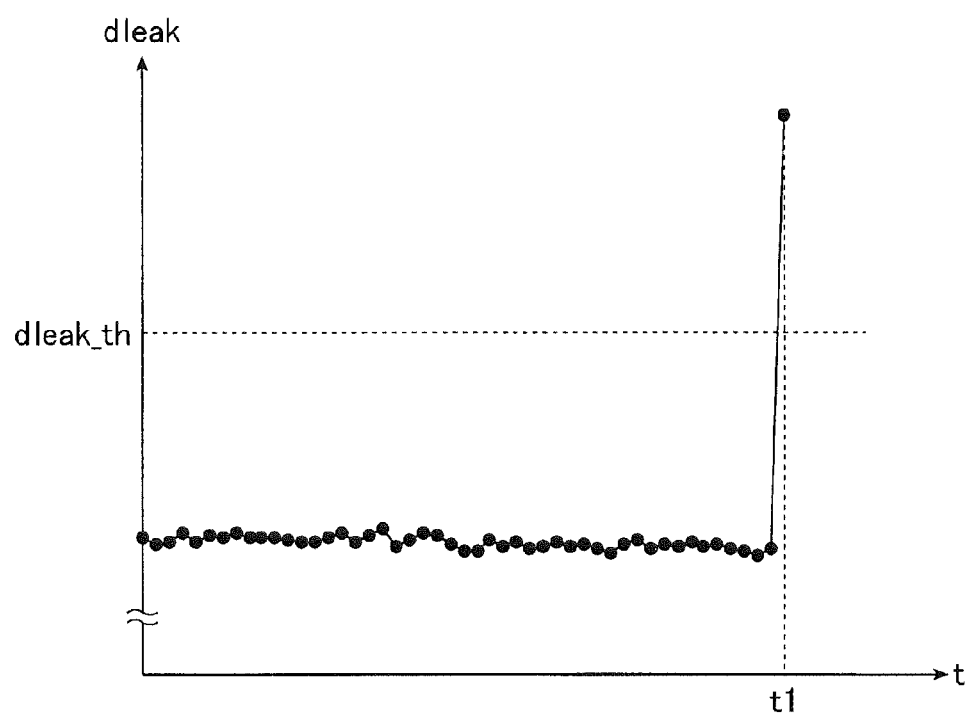
FIG. 14 is a chart in which the leak data having been read out is plotted in chronological order.

If the step of reading the leak data "d leak" and the step of resetting each radiation detection element 7 are performed on an alternate basis prior to radiation image capturing operation, as shown in FIG. 13, the leak data "d leak" read out at the moment when the irradiation of the radiation image capturing apparatus 1 has started will be much greater than the leak data "d leak" read previously as shown in FIG. 14.

Regarding FIGS. 13 and 14, on-voltage is applied to the line L4 of the scanning line 5 in FIG. 13 and the step of resetting is performed. The leak data "d leak" having been read in the 4th reading operation corresponds to the leak data "d leak" at time t1 of FIG. 14. Further, "R" in FIG. 13 represents the step of resetting each radiation detection element 7, and "L" denotes the step of reading the leak data "d leak". Tac in FIG. 13 will be described later.

It is possible to arrange such a configuration that the control device 22 of the radiation image capturing apparatus 1 monitors the leak data "d leak" having been read out in the step of reading the leak data "d leak" prior to radiation image capturing. Thus, when the leak data "d leak" having been read out has exceeded a prescribed threshold value "d leak th" (FIG. 14) set in advance, the start of irradiation is detected.

Figure 15:
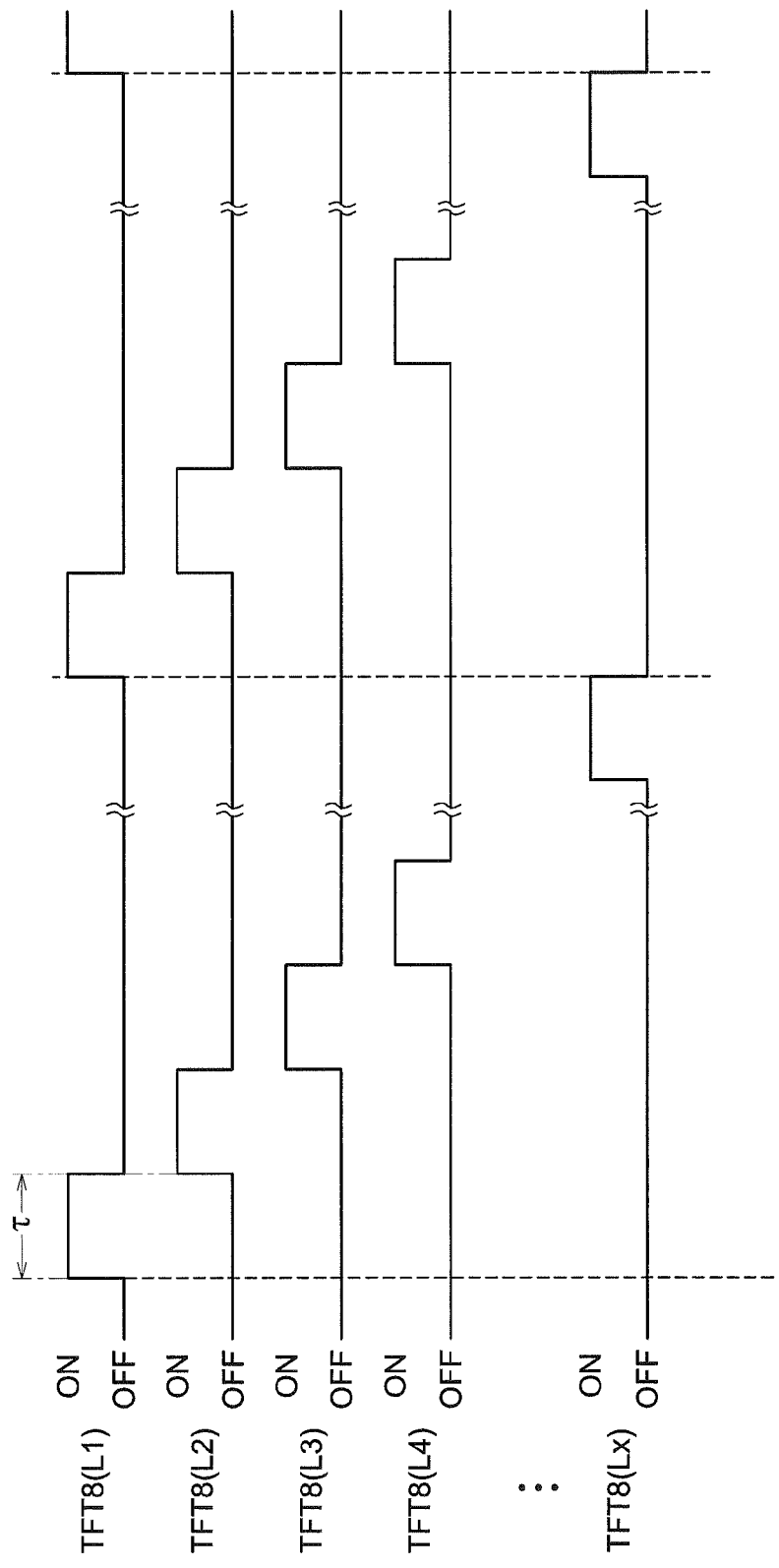
FIG. 15 is a timing chart showing the timing of application of on-voltage to each scanning line in the regular step of resetting each radiation detection element.

The regular step of resetting each radiation detection element 7 is carried out as shown in FIG. 15 by sequentially applying on-voltage to each line L1 to Lx of the scanning line 5 from the scanning drive unit 15.

As known by comparing this with FIG. 12, when being configured in this detection method 1 so that the step of reading the leak data "d leak" and the step of resetting each radiation detection element 7 are carried out on an alternate basis (refer to FIG. 12), there is a feature such that the cycle from application of on-voltage to a certain scanning line 5 until application of on-voltage to the next scanning line 5 is longer than the case of the regular step of resetting each radiation detection element 7 (refer to FIG. 15) by the time period for the step of reading the leak data "d leak".

To increase sensitivity of the leak data "d leak" read out, there are cases where the abovementioned cycle r or transmission interval T of pulse signals Sp1 and Sp2 (refer to FIG. 12) is set longer. In this case, the abovementioned cycle τ becomes further longer than the regular step of resetting each radiation detection element 7.

On the other hand, when the control device 22 has detected the start of irradiation in the manner described above, application of on-voltage to each scanning line 5 is suspended at this moment, as shown in FIG. 13, and off-voltage is applied to all the lines L1 through Lx of the scanning line 5 from the gate driver 15b so that each of the TFTs 8 is turned off. Then the electric charge produced inside each radiation detection element 7 by irradiation is accumulated in each radiation detection element 7 so that the element is kept supplied with electric charges.

A prescribed time after detection of the start of irradiation, the control device 22 starts application of on-voltage to the scanning line 5 (line L5 of the scanning line 5 in FIG. 13) to which on-voltage is to be applied immediately after scanning line 5 (line L4 of the scanning line 5 in FIG. 13) to which on-voltage was applied by the resetting step immediately before the start of irradiation has been detected in the step of reading the leak data "d leak" prior to radiation image capturing for example. Thus, on-voltage is sequentially applied to each scanning line 5, and image data D as the main image is read.

Hereinafter, the scanning line 5 (line L4 of the scanning line in FIG. 13) to which on-voltage is applied in the resetting step immediately before the detection time point of the irradiation start in the reading step of leak data "d leak" prior to radiation image capturing is called the detection line. The scanning line 5 (line L5 of the scanning line in FIG. 13) to which on-voltage is applied at a time of the start of the reading step of image data D as the main image is called a read-out startup line.

It is also possible to configure so that the read-out startup line is the first line L1 of the scanning line 5 for example instead of being the next line (line L5 of the scanning line in FIG. 13) to the detection line of the scanning line 5 (line L4 of the scanning line in FIG. 13).

[Detection Method 2]

Figure 16:
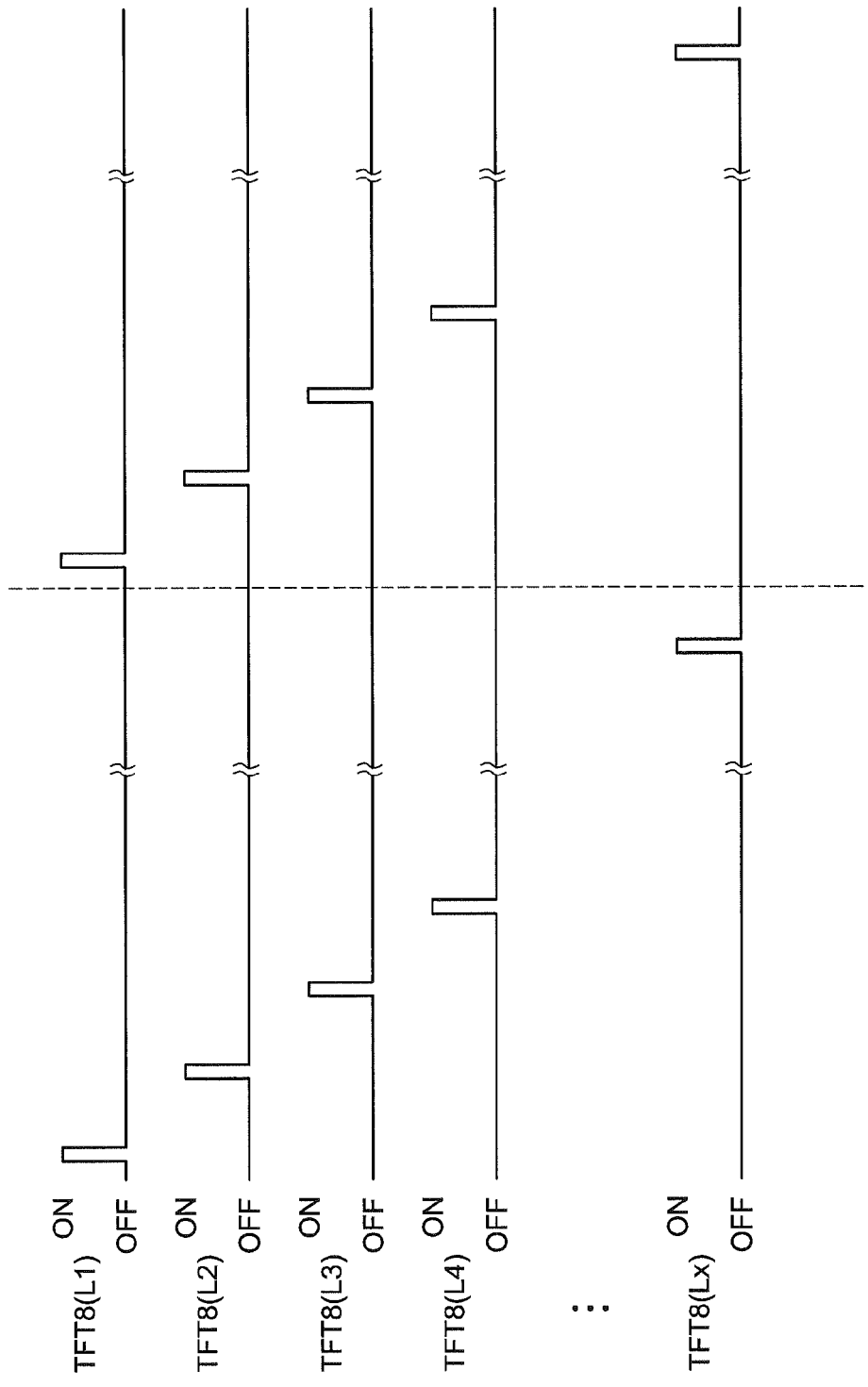
FIG. 16 is a timing chart showing the timing when on-voltage is sequentially applied to each scanning line, in the case where the step of reading the image data for detecting the start of irradiation is repeated in the detection method 2.

Instead of the structure wherein the step of reading the leak data "d leak" is performed prior to the radiation image capturing operation as in the aforementioned detection method 1, it is possible to adopt such a structure that on-voltage is sequentially applied to each of the lines L1 through Lx of the scanning line 5 from the gate driver 15b of the scanning drive unit 15, prior to radiation image capturing operation, as shown in FIG. 16, so that the step of reading the image data "d" from each radiation detection element 7 is repeated.

As described above, in the following description, the image data for irradiation start detection to be read for detection of the start of irradiation prior to this radiation image capturing will be called image data "d", for distinction from the image data D as a main image to be read immediately after image capturing. Hereinafter, the image data D for a main image will be called main image data D.

Figure 17:
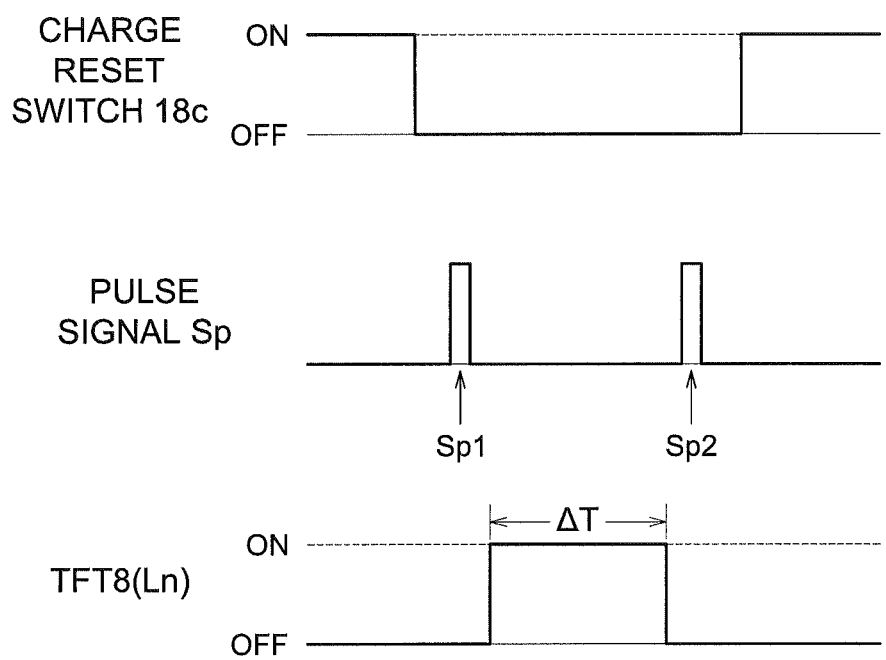
FIG. 17 is a timing chart showing the charge reset switch, pulse signal, on-off timing of the TFT and on-time ΔT in the step of reading the image data for detecting the start of irradiation.

The on/off operation of the charge reset switch 18c of the amplification circuit 18 in the reading circuit 17 at the time of reading the image data "d", and the transmission of the pulse signals Sp1 and Sp2 to the correlated dual sampling circuit 19 are performed as shown in FIG. 17 in the same procedure as that in the step of reading the image data D reading of FIG. 9. It should be noted that $\Delta T$ in FIG. 17 will be described later.

Figure 18:
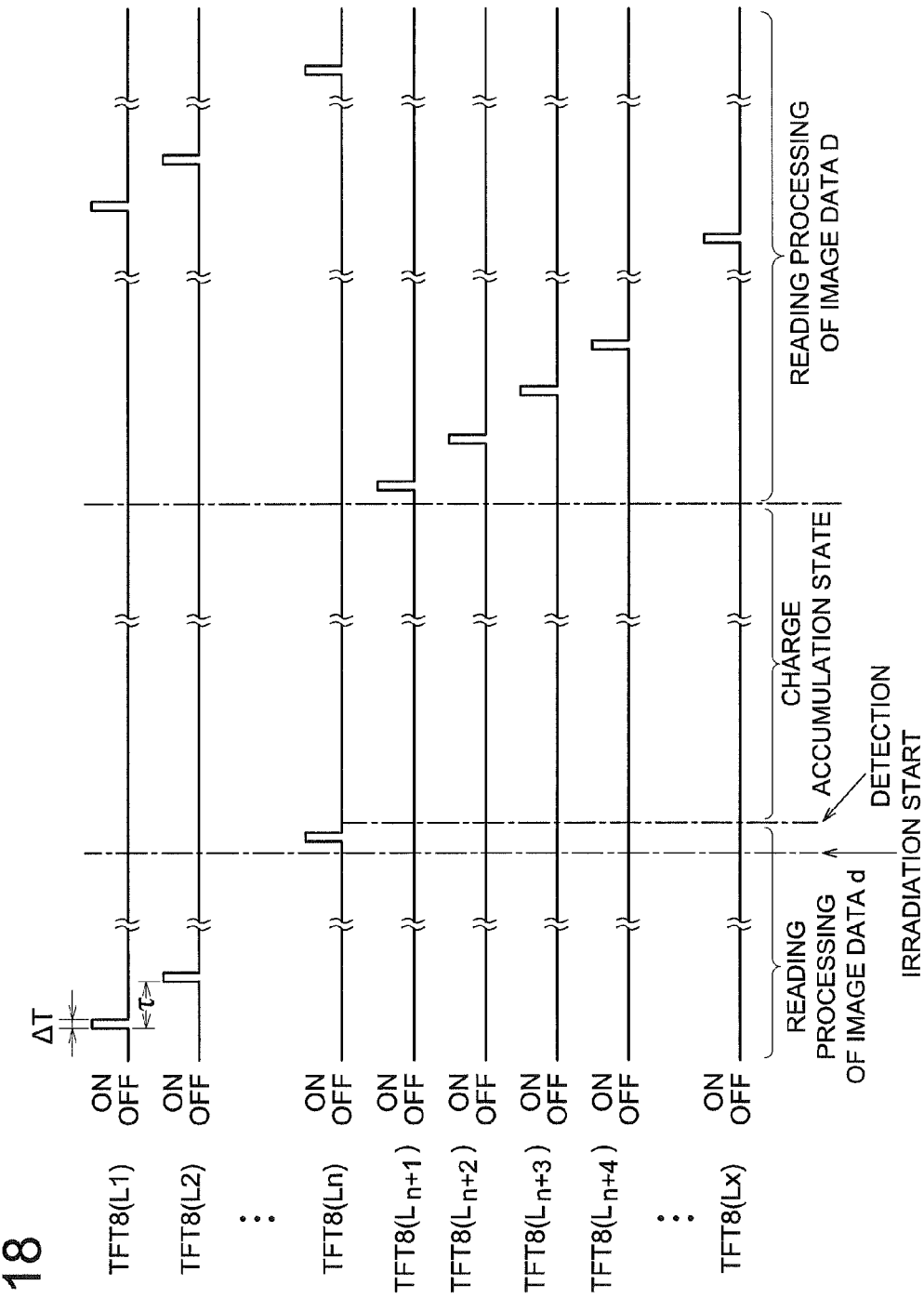
FIG. 18 is a timing chart showing the timing when on-voltage is sequentially applied to each scanning line, in the case where the step of reading the image data is repeated prior to radiation image capturing operation in the detection method 2.

As described above, if the structure is designed in such a way that the image data "d" is read prior to radiation image capturing operation, when irradiation of the radiation image capturing apparatus 1 has started as shown in FIG. 18, the value of the image data "d" (the image data "d" read out by application of the on-voltage to the line Ln of the scanning line 5 in FIG. 18) read out at this moment increases far over that value of the image data "d" read previously, similarly to the case of the leak data "d leak" shown in FIG. 14.

Accordingly, it is possible to arrange such a configuration that the image data "d" read out prior to radiation image capturing operation is monitored by the control device 22 of the radiation image capturing apparatus 1, and the start of irradiation is detected when the value of the image data "d" read out has exceeded a prescribed threshold value "dth" set in advance.

In this case, having detected the start of irradiation in the aforementioned procedure, the control device 22 suspends application of on-voltage to each scanning line 5 at this moment as shown in FIG. 18, and applies off-voltage to all the lines L1 through Lx of the scanning line 5 from the gate driver 15b so that each of the TFTs 8 is turned off. Then the electric charge produced inside each radiation detection element 7 by irradiation is accumulated in each radiation detection element 7 so that the element is kept supplied with electric charges.

When a prescribed time has passed after detection of the start of irradiation, the control device 22 starts application of on-voltage to the scanning line 5 (line Ln+1 of the scanning line 5 in FIG. 18. That is, read-out startup line Ln+1) to which on-voltage is to be applied immediately after the scanning line 5 (line Ln of the scanning line 5 in FIG. 18) to which on-voltage was applied at the time of the start of irradiation has been detected in the step of reading the image data "d" prior to radiation image capturing. Thus, on-voltage is sequentially applied to each scanning line 5, and main image data D is read.

In the case of FIG. 18, it is also possible to arrange such a configuration that the read-out startup line is the first line L1 of the scanning line 5, for example in stead of being the next line (line Ln+1 of the scanning line 5 in FIG. 18) to the detection line of the scanning line 5 (line Ln of the scanning line 5 in FIG. 18) as the above. The $\Delta T$ and others in FIG. 18 will be described later.

In the case of this detection method 2, the on-off control of the charge reset switch 18c (FIG. 17) in the step of reading the image data "d" for detecting the start of irradiation, the transmission intervals between pulse signals Sp1 and Sp2, and the time $\Delta T$ of applying on-voltage to each of lines L1 through Lx of the scanning line 5 (hereinafter referred to as "on-time) can be configured under the same conditions as those in the step of reading the main image data D.

Further, for the purpose of improving the sensitivity of the image data "d" to be read out, a longer time may be set as the above-mentioned on-time $\Delta T$ or the cycle time $\tau$ between the application of on-voltage to one of the scanning lines 5 to the application of on-voltage to another scanning line 5 shown in FIG. 18. In such a case, the on-time $\Delta T$ or cycle time $\tau$ is longer than that when the main image data D is read out.

[Offset Data Read-Out Processing]

The following describes the step of reading the offset data O to be performed subsequent to the step of reading the main image data D in the radiation image capturing apparatus 1 of the present embodiment.

As described above, when the start of irradiation has been detected (FIG. 13 and FIG. 18), the control device 22 allows the off-voltage to be applied to each of lines L1 through Lx of the scanning line 5 from the gate driver 15b, so that the electric charge state transfers to the state of electric charge accumulation. After that, on-voltage is sequentially applied to each scanning line 5 so that the main image data D is read out.

After the main image data D has been read out, the control device 22 allows the offset data O to be read out.

In the present embodiment, the step of reading out the offset data O is performed by repeating the same processing sequence as the sequence prior to the step of detecting the start of irradiation (FIG. 13 and FIG. 18). However, radiation image capturing apparatus 1 is not irradiated in this case.

Figure 19:
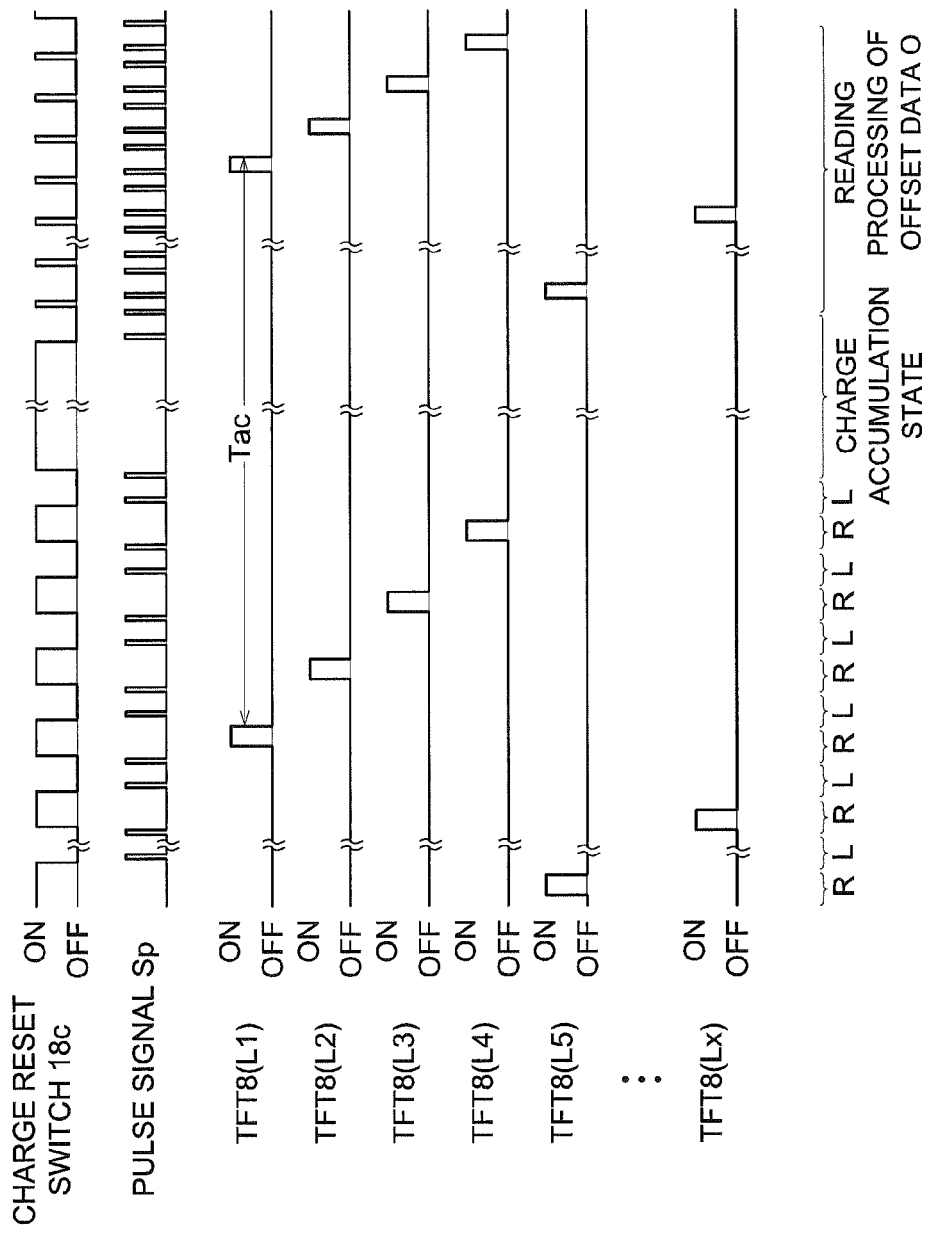
FIG. 19 is a timing chart showing the timing for applying on-voltage to each scanning line when the reading of the offset data is performed by repeating the processing sequence of FIG. 13.

To be more specific, in the step of reading the offset data O, after the main image data D has been read out, the step of reading the leak data "d leak" ("L" in FIG. 19) and the step of resetting each radiation detection element 7 ("R" in FIG. 19) are executed at least once for each scanning line on an alternate basis in the same cycle time as the step of reading the leak data "d leak" and the step of resetting each radiation detection element 7 (FIG. 13) performed prior to the step of detecting the start of irradiation, as shown in FIG. 19 representing the above-mentioned detection method 1.

The off-voltage is applied to each scanning line 5 from the scanning drive unit 15 for the same time duration as that for the state of electric charge accumulation (FIG. 13) prior to the detection of the start of irradiation (as illustrated in "the state of electric charge accumulation" of FIG. 19). After that, the step of reading the offset data O from each radiation detection element 7 is executed at the same cycle time as that for the step of reading the main image data D (FIG. 13)

In the case of the detection method 2, similarly the step of reading the offset data O can be executed by repeating the same processing sequence as the sequence prior to the detection of the start of irradiation (FIG. 18).

[Structure for Protecting the True Image Data D* Against Level Difference]

Figure 28:
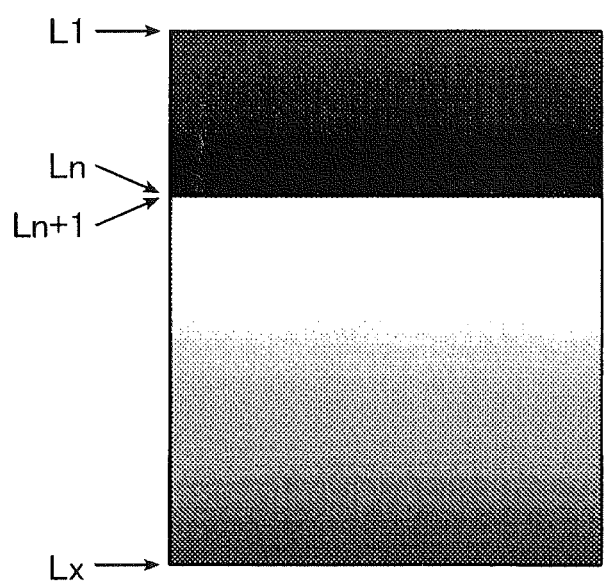
FIG. 28 is a diagram showing the level difference occurring to the true image data.

The following is a study of the causes for the level difference occurring to the true image data D*, as shown in FIG. 28, and describes the structure for protecting the true image data D* against level difference. The operation of the radiation image capturing apparatus 1 in the present embodiment is also described.

In the first place, the following describes an example of using the above-mentioned detection method 1 as the method of detecting the start of irradiation.

[Structure 1]

A structure is configured to ensure that the step of reading the offset data O (FIG. 19) can be executed by repeating the same processing sequence as that prior to the detection of the start of irradiation (FIG. 13), as in the above-mentioned embodiment.

To be more specific, a structure is configured to ensure that, after the main image data D has been read, for example, as shown in FIG. 13, the step of reading the leak data "d leak" ("L" of FIG. 19) and the step of resetting each radiation detection element 7 ("R" of FIG. 19) are executed on an alternate basis at the same cycle time i as that for the step of reading the leak data "d leak" and the step of resetting each radiation detection element 7 performed prior to the detection of the start of irradiation. The off-voltage is then applied to each scanning line 5 from the scanning drive unit 15 for the same time duration as that of the state of electric charge accumulation (FIG. 13). After that, on-voltage is sequentially applied to each scanning line 5 at the same cycle time as that for the step of reading the main image data D so that the step of reading the offset data O from each radiation detection element 7 is executed.

[Cause 1-1]

The amount of dark electric charge read out from each radiation detection element 7 is subject to change depending on the time when the TFT 8 connected to the relevant radiation detection element 7 is kept turned off, i.e., the time Tac (hereinafter referred to as "effective accumulation time Tac") of FIG. 13. In this case, the study by the present inventors has revealed that the relationship between the amount of dark electric charge read out of each radiation detection element 7 and effective accumulation time Tac is not always linear.

To be more specific, the amount of dark electric charge read out of each radiation detection element 7 is not always proportional to the effective accumulation time Tac in at least the time area wherein the effective accumulation time Tac is shorter. However, if the effective accumulation time Tac is the same, the amount of dark electric charge read out of each radiation detection element 7 is the same.

Thus, as described above, if the structure is configured to ensure that the step of reading the offset data O can be executed by repeating the same processing sequence as that up to the step of reading out the main image data D, the effective accumulation time Tac (FIG. 13) in the step of reading the main image data D will be at least the same as the effective accumulation time Tac (FIG. 19) in the step of reading the offset data O for each scanning line 5.

The above-mentioned structure ensures that the amount of dark electric charge read out of each radiation detection element 7 in the step of reading the main image data D is the same as that in the step of reading the offset data O for each scanning line 5.

Thus, the offset resulting from the dark electric charge superimposed on the main image data D having been read out becomes the same as the offset data O having been read out for each radiation detection element 7. Accordingly, the offset resulting from the dark electric charge contained in both of them is cancelled out by subtracting the offset data O from the main image data D. Thus, the true image data D* calculated by the subtraction becomes the data resulting from only the electric charge generated in each radiation detection element 7 by irradiation.

This structure allows the true image data D* to be free from level difference, with the result that level difference is appropriately prevented from occurring to the true image data D*.

[Cause 1-2]

Another characteristic of the above-mentioned [Structure 1] can be found in that, after the main image data D has been read, the step of reading the leak data "d leak" are executed on an alternate basis with the step of resetting each radiation detection element 7, prior to the step of reading the offset data O.

As described above, in the step of reading the offset data O, radiation image capturing apparatus 1 is not exposed to radiation. Thus, the leak data "d leak" for detecting the start of irradiation need not be read in the step of reading the offset data O.

Thus, subsequent to the step of reading the main image data D and prior to the step of reading the offset data O, only the step of resetting each radiation detection element 7 is executed at the same cycle time z as that for resetting each radiation detection element 7 which has been performed alternately with the step of reading the leak data "d leak" prior to the detection of the start of irradiation, without the step of reading the leak data "d leak" being executed. If this structure is configured, the effective accumulation time Tac in the step of reading the main image data D is the same as that in the step of reading the offset data O for each scanning line 5, similarly to the case of the above-mentioned [Cause 1-1].

This suggests the possibility of designing in such a structure that, subsequent to the step of reading the main image data D and prior to the step of reading the offset data O, only the step of resetting each radiation detection element 7 is performed, as described above, without the step of reading the leak data "d leak" being performed.

The following describes the phenomena and grounds for supporting the structure wherein, subsequent to the step of reading the main image data D and prior to the step of reading the offset data O, the reading circuit 17 (FIG. 6 and FIG. 7) is driven to perform the step of reading the leak data "d leak" alternately with the step of resetting each radiation detection element 7, as shown in the above-mentioned [Structure 1].

In the first place, the following describes the phenomena as prerequisites. In the radiation image capturing apparatus 1 having the above-mentioned structure, the electric potential V of each signal line 6 when the step of resetting each radiation detection element 7 is performed is known to be lower than the potential V (i.e., the above-mentioned base potential $V_0$) of each signal line 6 when the step of reading the leak data "d leak" (same for the step of reading the image data D and image data "d") is performed.

As described above, when the step of reading is executed, base potential $V_0$ is applied to each signal line 6 through the operation amplifier 18a (FIG. 7) of the amplification circuit 18 of the reading circuit 17. Even if this base potential $V_o$ is changed in various ways, the potential V of each signal line 6 at the time of resetting each radiation detection element 7 is reduced below the potential V of each signal line 6 at the time of reading out the leak data "d leak" or others, as described above. However, causes for this phenomenon are not yet clear at the present moment.

Figure 20A:
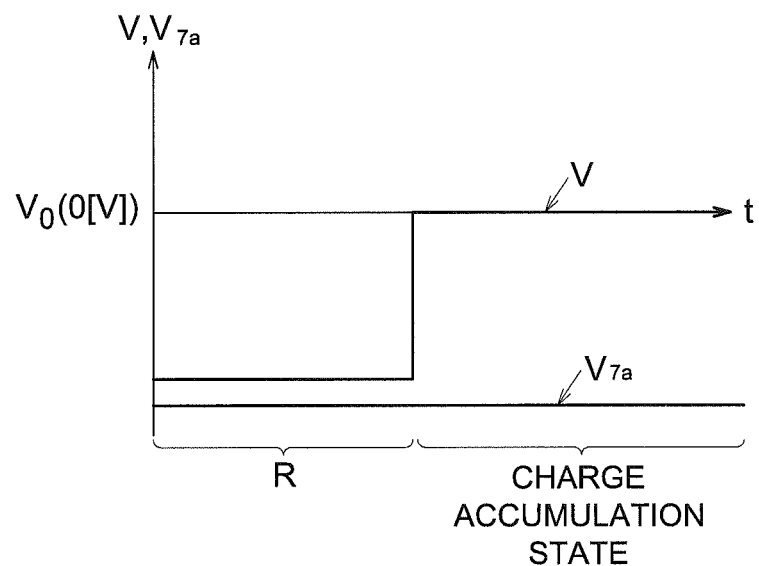
FIG. 20A is a chart showing the transition of the potential in the signal line when only the step of resetting each radiation detection element 7 has been executed.

As described above, if the above-mentioned phenomenon (as a prerequisite) has occurred, when only the step of resetting each radiation detection element 7 is executed subsequent to the step of reading the main image data D without the step of reading the leak data "d leak" being executed, the potential V of each signal line 6 rises from a lower potential to the base potential $V_0$, starting at the moment of the transfer from the step of resetting ("R" in the Figure) to the state of electric charge accumulation, as shown in FIG. 20A.

Figure 20B:
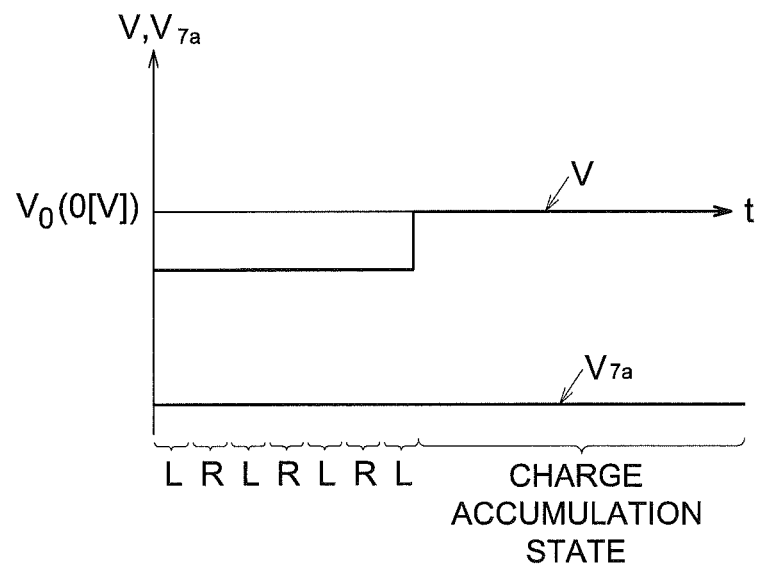
FIG. 20B is a chart showing the transition of the potential in the signal line when both the step of reading the leak data and the step of resetting have been performed on an alternate basis.

In FIGS. 20A and 20B, the base potential $V_0$ is set to "V". The potential V7a of the first electrode 7a of the radiation detection element 7 in the chart will be described later.

In the meantime, when the structure is configured in such a way that the step of reading the leak data "d leak" and the step of resetting each radiation detection element 7 are executed alternately subsequent to the step of reading the main image data D, as in the case of the above-mentioned [Structure 1], the reduction in the potential of each signal line 6 from the base potential $V_0$ is not greater than that when only the step of resetting each radiation detection element 7 has been executed (FIG. 20A), as shown in FIG. 20B.

This is because the step of reading the leak data "d leak" ("L" in the Figure) and the step of resetting each radiation detection element 7 ("R" in the Figure) are repeated in a short time. This allows the fluctuation of the potential V of the signal line 6 to be flattened in a way. Thus, the value is located intermediately between the potential V of the signal line 6 (the lower potential on the left in FIG. 20A) when only the step of resetting each radiation detection element 7 has been executed, and the potential V of the signal line 6 (i.e., base potential $V_0$) when the step of reading is executed or in the state of electric charge accumulation.

In FIG. 20B, the potential V of the signal line 6 is illustrated to be constant when the step of reading the leak data "d leak" and the step of resetting each radiation detection element 7 are repeated in a short time. However, there may be a slight or greater variation in the vertical direction in some cases.

As illustrated in FIG. 20B, when the structure is so designed that the step of reading the leak data "d leak" and the step of resetting each radiation detection element 7 are executed on an alternate basis subsequent to the step of reading the main image data D as in the case of the above-mentioned [Structure 1], the potential of each signal line 6 also rises to the base potential $V_0$ at the time of transfer to the state of electric charge accumulation.

The inclination of the potential formed inside the TFT is increased as the difference between the potential V of the signal line 6 and potential V7a of the first electrode 7a (FIG. 6 and FIG. 7) of the radiation detection element 7 is greater. This results in an increase in the amount of electric charge "q" leaking from the radiation detection element 7 to the signal line 6 through the TFT 8. If there is an increase in the amount of the electric charge "q" leaking from the radiation detection element 7 to the signal line 6, the electric charge inside the radiation detection element 7 is reduced correspondingly.

In both FIGS. 20A and 20B, after the potential V of the signal line 6 has become the base potential $V_0$ resulting from transfer to the state of electric charge accumulation, the differences between the potential V of the signal line 6 and the potential V7a of the first electrode 7a of the radiation detection element 7 become the same. Thus, the amounts of electric charge "q" leaking from the radiation detection element 7 to the signal line 6 through the TFT 8 become the same level.

However, prior to transfer to the state of electric charge accumulation, the difference between the potential V of the signal line 6 and the potential V7a of the first electrode 7a of the radiation detection element 7 is smaller in the state illustrated FIG. 20A than in the state of the above-mentioned [Structure 1] illustrated in FIG. 20B. Thus, electric charge "q" is less subjected to leakage. Accordingly, in the state illustrated in FIG. 20A, the amount of dark electric charge remaining in the radiation detection element 7 is greater.

By contrast, in the state illustrated in FIG. 20B, the difference between the potential V of the signal line 6 and the potential V7a of the first electrode 7a of the radiation detection element 7 is relatively greater than that illustrated in FIG. 20A. The electric charge "q" is more subjected to leakage. This reduces the amount of dark electric charge remaining in the radiation detection element 7.

The above-mentioned difference is found in the phenomenon that occurs when only the step of resetting each radiation detection element 7 is executed (FIG. 20A) subsequent to the step of reading the main image data D without the step of reading the leak data "d leak" being executed, and the phenomenon that occurs when the step of reading the leak data "d leak" and the step of resetting each radiation detection element 7 are executed on an alternate basis (FIG. 20B) subsequent to the step of reading the main image data D as in the above-mentioned [Structure 1].

The following describes that, when such a phenomenon has occurred, a level difference occurs to the true image data D*, as shown with reference to FIG. 28.

Figure 21A:
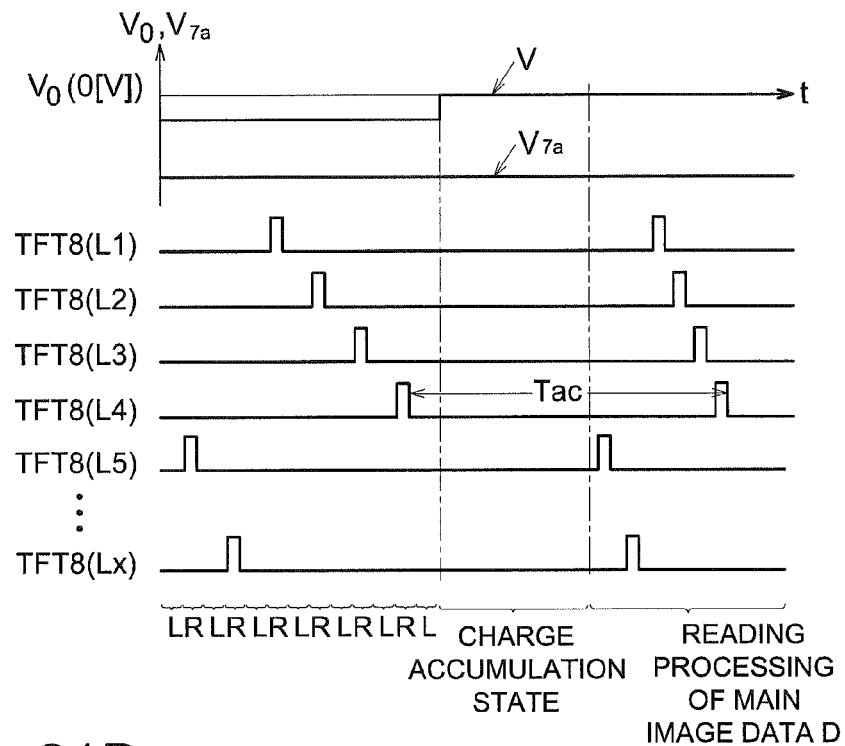
FIG. 21A is a diagram showing the relationship between the transition of the potential in the signal line and effective accumulation time during the step of reading the main image data.

In the present embodiment, prior to the step of reading the main image data D, the step of reading the leak data "d leak" (L) and the step of resetting each radiation detection element 7 (R) are executed on an alternate basis, as shown in FIG. 21A. As described above, before transfer to the state of electric charge accumulation, the potential V of the signal line 6 is lower. After transfer to the state of electric charge accumulation, the potential V of the signal line 6 rises to the base potential $V_0$.

Thus, the difference between the potential V of the signal line 6 and the potential V7a of the first electrode 7a of the radiation detection element 7 is small to some extent before transfer to the state of electric charge accumulation. The amount of electric charge "q" leaking from each radiation detection element 7 to the signal line 6 is smaller. After transfer to the state of electric charge accumulation, the potential difference is increased, so that the amount of electric charge "q" leaking from each radiation detection element 7 to the signal line 6 is increased.

When viewed from the effective accumulation time Tac for each of the lines L1 through Lx of the scanning line 5, the time duration before transfer to the state of electric charge accumulation differs for each of the lines L1 through Lx of the scanning line 5. To be more specific, the time duration before transfer to the state of electric charge accumulation is the shortest on the detection line L4 of the scanning line 5, and is prolonged in the order of lines L3, L2, . . . of the scanning line 5. This time duration is the longest on the read-out startup line L5 of the scanning line 5.

Thus, for example, on the detection line L4 of the scanning line 5, the time duration before transfer to the state of electric charge accumulation is short and the time duration after transfer to the state of electric charge accumulation is long in the effective accumulation time Tac. This increases the amount of electric charge "q" leaking to the signal line 6 from each radiation detection element 7 connected to the detection line L4. This reduces the amount of dark electric current remaining in each radiation detection element 7 connected to the detection line L4.

For example, on the read-out startup line L5 of the scanning line 5, the time duration before transfer to the state of electric charge accumulation is long and the time duration after transfer to the state of electric charge accumulation is short in the effective accumulation time Tac. This reduces the amount of electric charge "q" leaking to the signal line 6 from each radiation detection element 7 connected to the read-out startup line L5 and hence increases the amount of dark electric current remaining in each radiation detection element 7 connected to the read-out startup line L5.

Figure 22A:
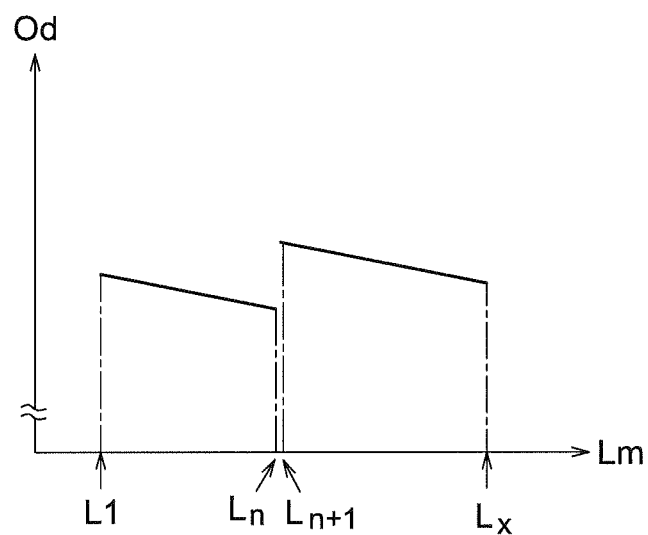
FIG. 22A is a chart formed by plotting the offset resulting from the dark electric charge superimposed on the main image data, for each scanning line.

Thus, the offset Od resulting from the dark electric charge remaining in each radiation detection element 7 i.e., the dark electric charge superimposed on the main image data D having been read in the step of reading the main image data D is reduced to the smallest level in the detection line Ln of the scanning line 5 as shown in FIG. 22A, and is increased to the greatest level in the read-out startup line Ln+1. It should be noted that, in FIG. 22A and FIG. 22B, the detection line of the scanning line 5 is represented as "Ln" and the read-out startup line as "Ln+1" in a generalized form.

Figure 21B:
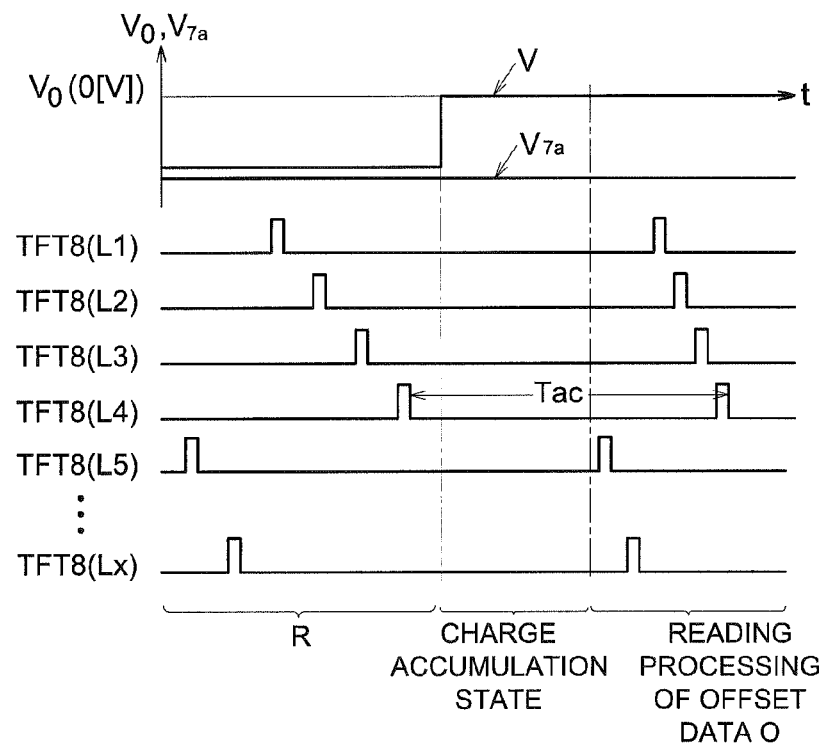
FIG. 21B is a diagram showing the relationship between the transition of the potential in the signal line and effective accumulation time during the step of reading the offset data.

In the meantime, as described above, when the structure is so configured that only the step of resetting each radiation detection element 7 is executed subsequent to the step of reading the main image data D without the step of reading the leak data "d leak" being executed, the same phenomenon occurs as illustrated in FIG. 21B, To be more specific, in the detection line L4 of the scanning line 5, the time duration before transfer to the state of electric charge accumulation is short in the effective accumulation time Tac. This reduces the amount of dark electric charge remaining in each radiation detection element 7. Further, in the read-out startup line L5 of the scanning line 5, the time duration before transfer to the state of electric charge accumulation is long in the effective accumulation time Tac. This increases the amount of dark electric charge remaining in each radiation detection element 7.

In the case of FIG. 21B, however, in the time duration before transfer to the state of electric charge accumulation, the difference between the potential V of the signal line 6 and the potential V7a of the first electrode 7a of the radiation detection element 7 is smaller than that in FIG. 21A. Thus, there is almost no leakage of electric charge "q" from each radiation detection element 7 to the signal line 6.

Figure 22B:
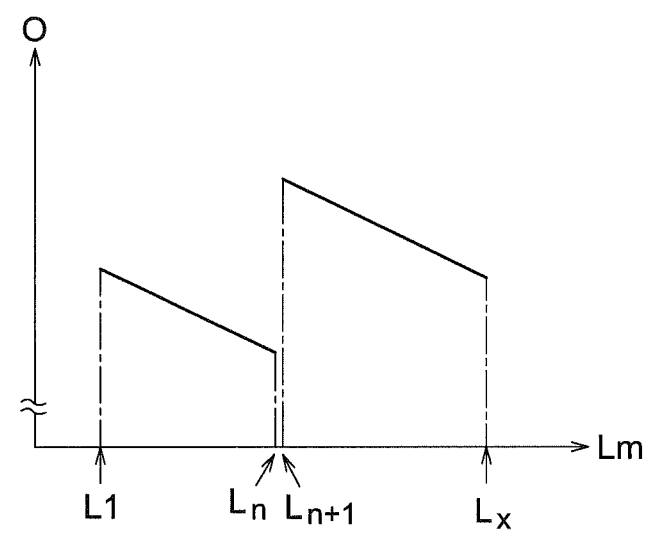
FIG. 22B is a chart formed by plotting the offset resulting from the dark electric charge superimposed on the offset data, for each scanning line.

Therefore, as shown in FIG. 22B, the offset data O to be read out is reduced to the smallest level on the detection line Ln of the scanning line 5 and is increased to the greatest level on the read-out startup line Ln+1 similarly to the case of the offset Od in FIG. 22A. However, the range of the fluctuation of the offset data O is greater than that in the case of the offset Od in FIG. 22A.

To be more specific, in the state shown in FIG. 21A, roughly speaking there is not much change of difference between the potential V of the signal line 6 and the potential V7a of the first electrode 7a of the radiation detection element 7 before and after transfer to the state of electric charge accumulation. Therefore, there is not much difference in the offset Od resulting from dark electric charge superimposed on the main image data D read out in the step of reading the main image data D between before and after the state of electric charge accumulation, as shown in FIG. 22A.

In the state of FIG. 21B, however, there is a big change of difference between the potential V of the signal line 6 and the potential V7a of the first electrode 7a of the radiation detection element 7 before and after transfer to the state of electric charge accumulation. There is a great change in the amount of electric charge "q" leaking out of each radiation detection element 7. To put it another way, there is a great change in the amount of dark electric current remaining in each radiation detection element 7. Accordingly, before and after transfer to the state of electric charge accumulation, the offset data O having been read out exhibits a comparatively great change based on the boundary between the detection line Ln and read-out startup line Ln+1, as shown in FIG. 22B.

As described above, if the structure is so designed that only the step of resetting each radiation detection element 7 is executed subsequent to the step of reading the main image data D without the step of reading the leak data "d leak" being executed and the step of reading offset data O is executed, the fluctuation range of the offset Od resulting from dark electric charge superimposed on the main image data D will be different from that of the offset data O read out in the step of reading the offset data O, as shown in FIG. 22A and FIG. 22B.

Figure 23:
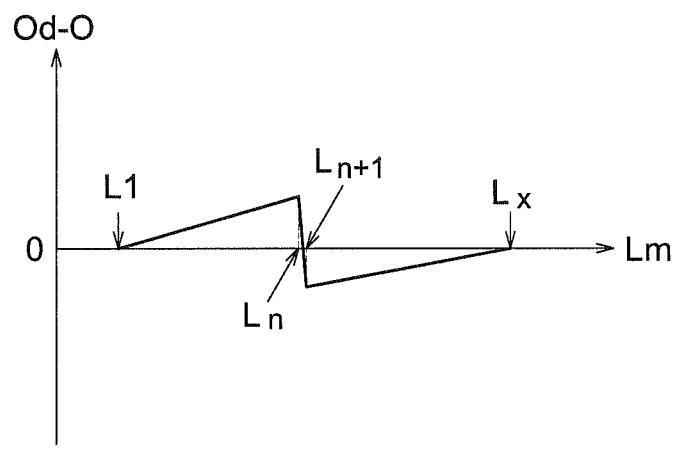
FIG. 23 is a chart showing that the offset resulting from the dark electric charge superimposed on the main image data and the offset data are not cancelled, with the result that a level difference has occurred.

Thus, even if the offset data O is subtracted from the main image data D, there will be no canceling-out between the offset Od resulting from dark electric charge superimposed on the main image data D and the offset data O, as shown in FIG. 23. This is considered to produce a level difference in the true image data D*.

By contrast, if the step of resetting each radiation detection element 7 and the step of reading the leak data "d leak" are executed on an alternate basis after the step of reading the main image data D and prior to the step of reading the offset data O as in the above-mentioned [Structure 1], the situation up to the step of reading the main image data D is the same as that of FIG. 21A or FIG. 22A.

Further, subsequent to the step of reading the main image data D, the step of reading the leak data "d leak" is also executed on an alternate basis with the step of resetting each radiation detection element 7. Accordingly, the potential V of the signal line 6 exhibits the same behavior as that of the FIG. 21A instead of FIG. 21B. Thus, the offset data O to be read out fluctuates as shown in FIG. 22A instead of FIG. 22B.

To be more specific, when the structure is so configured as in the above-mentioned [Structure 1], both the offset Od resulting from dark electric charge superimposed on the main image data D and the offset data O to be read thereafter exhibit the fluctuation of FIG. 22A. Thus, if the offset data O is subtracted from the main image data D, there is a precise canceling-out between the offset Od resulting from dark electric charge superimposed on the main image data D and the offset data O.

The difference Od−O between the offset Od and offset data O is reduced to almost 0 (or approximately to a prescribed value) by each radiation detection element 7 linked to the lines L1 through Lx of the scanning line 5. In case of the above-mentioned [Structure 1], therefore, a level difference does not occur to the true image data D*.

As described above, the above-mentioned [Structure 1] precisely prevents a level difference from occurring to the true image data D.

[Variation in Structure 1]

The phenomenon illustrated in FIG. 20A through FIG. 22B does not occur, if there is no phenomenon as a prerequisite to the above-mentioned [Cause 1-2], namely, if there is no phenomenon wherein the potential of each signal line 6 when executing the step of resetting each radiation detection element 7 is different from the potential of each signal line 6 when executing the step of reading the leak data "d leak" or the like in the radiation image capturing apparatus 1.

In the above-mentioned [Structure 1], the step of reading the leak data "d leak" and the step of resetting each radiation detection element 7 are executed subsequent to the step of reading the main image data D and prior to the step of reading the offset data O. This structure can be changed into the structure wherein only the step of resetting each radiation detection element 7 is executed as described above.

To be more specific, it is possible to configure the structure in such a way that the step of resetting each radiation detection element 7 is performed at the same cycle time τ as that of the step of resetting each radiation detection element 7 executed alternately with the step of reading the leak data "d leak", subsequent to the step of reading the main image data D and prior to the step of detecting the start of irradiation. The off-voltage is applied to each scanning line 5 from the scanning drive unit 15 for the same time duration as that for the state of electric charge accumulation prior to the step of reading the main image data D. After that, the step of reading the offset data O from each radiation detection element 7 is executed at the same cycle time as that for the step of reading the main image data D.

This structure meets at least the conditions studied with reference to [Cause 1-1] in the above-mentioned [Structure 1] as well, thereby appropriately preventing a level difference from occurring to the true image data D*.

[Structure 2]

As described above, it would be possible in normal cases to repeat the regular steps of resetting each radiation detection element 7 without the step of reading the leak data "d leak" being executed (FIG. 15), subsequent to the step of reading the main image data D (FIG. 13) and prior to the step of reading the offset data O (FIG. 19), for example, for the purpose of removing the portion of the main image data D left unread.

However, if this structure is configured, as described above, the offset Od resulting from dark electric charge superimposed on the main image data D and the offset data O read in the subsequent step of reading the offset data O fail to reach the same value. A level difference may occur to the true image data D*, as shown in FIG. 28.

The following describes examination of the cause for such a phenomenon and describes the structure for preventing a level difference from occurring to the true image data D* (FIG. 28).

In the step of resetting each radiation detection element 7 to be executed alternately with the step of reading the leak data "d leak" prior to the transfer to the state of electric charge accumulation in the step of reading the offset data O, the step of resetting each radiation detection element 7 to be executed by application of on-voltage to each of the lines L5 through Lx and L1 through L4 of the scanning line 5, which is performed once is referred to as a step of resetting for one frame as one step for each scanning line 5 for one surface mounted on the detecting section P, as shown in FIG. 19.

To be more specific, in general terms, a step of resetting for one frame indicates the step of resetting each radiation detection element 7 wherein, from the line Ln+1 of the scanning line 5 having started reading in the step of reading the main image data D, namely the read-out startup line Ln+1, on-voltage is applied once to each of the lines up to the line Ln of scanning line 5, which is one-line upstream, namely up to the detection line Ln.

The step of resetting for two frames represents the case of executing the above-mentioned step of resetting by application of on-voltage twice for example, to each scanning line 5, namely, the case of executing the step of resetting each radiation detection element 7 by applying on-voltage applied sequentially to the detection line Ln from the read-out startup line Ln+1 of the scanning line 5 again after applying on-voltage sequentially to the detection line Ln from the read-out startup line Ln+1 of the scanning line 5.

[Cause 2]

According to the study made by the present inventors, it is considered that the above-mentioned problem is raised by the change in the amount of electric charge "q" leaking to the signal line 6 from each radiation detection element 7 through the TFT 8 if the regular step of resetting each radiation detection element 7 (FIG. 15) is executed without the step of reading the leak data "d leak" being executed. This will be described specifically below.

As described above, the electric charge "q" leaks from each radiation detection element 7 to the signal line 6 through each TFT 8 set in the OFF mode (FIG. 10). This phenomenon occurs normally without being restricted to the step of reading the leak data "d leak". This occurs in the step of reading the main image data D and in the step of reading the offset data O as well.

Thus, the offset data O read out with respect to a certain radiation detection element 7 includes not only the offset Od resulting from dark electric charge (the above-mentioned [Structure 1]) accumulated in this radiation detection element 7, but also the offset representing the total value of the electric charge "q" leaking through each TFT 8 from other radiation detection element 7 connected to the signal line 6 which is connected to this radiation detection element 7.

In the following description, the total value of the electric charge "q" leaking from other radiation detection elements 7 through each TFT 8 will be called the total leak value Q simply. Further, the offset resulting from the total leak value Q is referred to as the offset Oq.

The main image data D read out with respect to this radiation detection element 7 includes the offset resulting from the dark electric charge accumulated in this radiation detection element 7 and the offset Oq resulting from the total leak value Q as an offset, in addition to the data resulting from the electric charge generated inside the radiation detection element 7 due to irradiation (i.e., the data corresponding to the true image data D*).

From an idealistic viewpoint, if the offset data O is subtracted from the main image data D, the offset resulting from the dark electric charge and the offset resulting from the total leak value Q included in both should be cancelled out with each other, and only the true image data D* resulting from the electric charge generated inside the radiation detection element 7 due to irradiation should remain.

However, the research made by the present inventors has revealed that, as described above, if the regular step of resetting each radiation detection element 7 (FIG. 15) is repeated after the step of reading the main image data D, the offset Oq resulting from the total leak value Q included in the offset data O may be greater, in some cases, than the offset Oq resulting from the total leak value Q contained in the main image data D.

To put it more specifically, it is supposed that as shown in FIG. 13, when the step of reading the leak data "d leak" and the step of resetting each radiation detection element 7 are executed alternately, and the step of reading the main image data D is executed subsequent to the transfer to the state of electric charge accumulation, the total leak value Q is read out during the step of reading the main image data D.

To be more specific, for example, the step of reading the leak data "d leak" is executed during the step of reading the main image data D, and the total leak value Q is read out. Then as shown in FIG. 24, the total leak value Q is obtained for each scanning line 5 including the detection line Ln and read-out startup line Ln+1.

Figure 24:
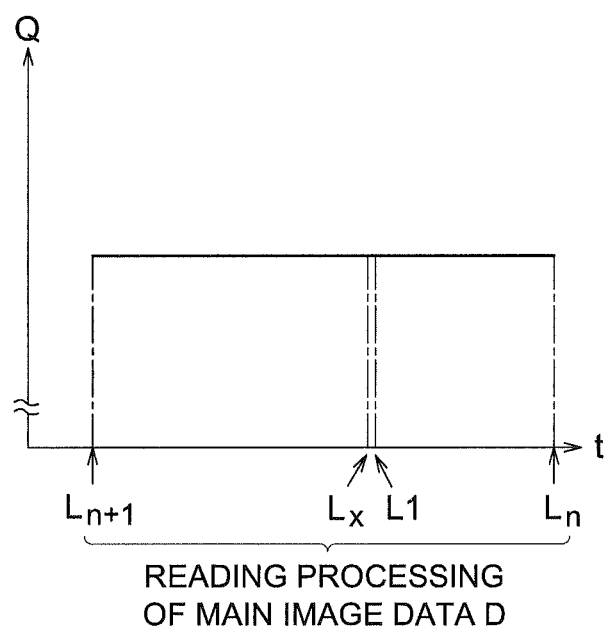
FIG. 24 is a chart formed by plotting in chronological order the total leak value having been read during the step of reading the main image data.
Figure 25:
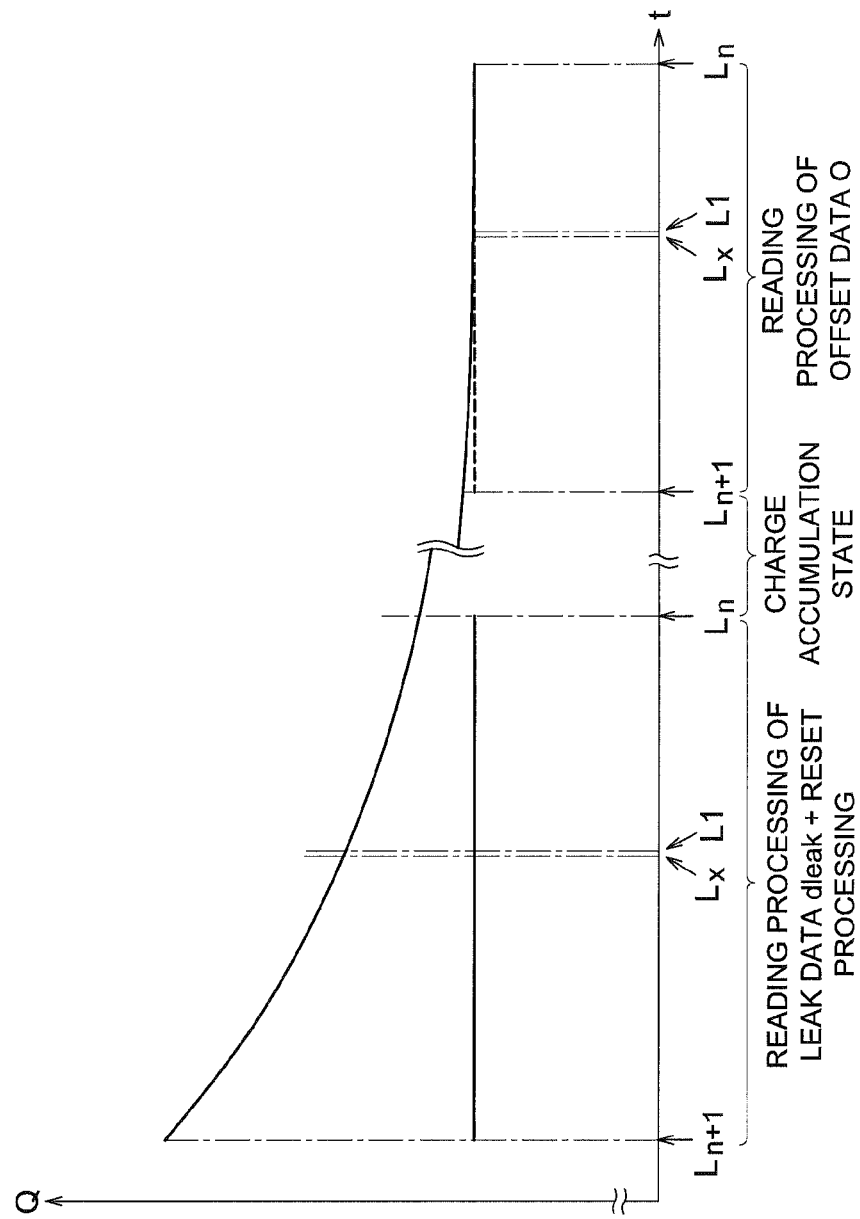
FIG. 25 is a chart formed by plotting in chronological order the total leak value having been read after the regular step of resetting each radiation detection element.

In the chart of FIGS. 24 and 25 (to be described later), the horizontal axis indicates the time "t". The time when on-voltage is applied to each of the lines L1, Ln, Ln+1, Lx and others of the scanning line 5 in the step of reading the main image data D is shown as each of "L1", Ln", Ln+1", "Lx" and others. Further, FIG. 24 shows that the total leak value Q assumes almost the same value on each scanning line 5. However, the value may be different for each scanning line 5, depending on the radiation image capturing apparatus 1.

By contrast, when the regular step of resetting each radiation detection element 7 is repeated after the step of reading the main image data D (FIG. 15), the total leak value Q (i.e., leak data "d leak") read out in the step of reading the leak data "d leak" executed immediately thereafter alternately with the step of resetting each radiation detection element 7 becomes remarkably large, as shown in FIG. 25.

It has been revealed that the total leak value Q is gradually reduced in the course of repeating the step of reading the leak data "d leak" and the step of resetting each radiation detection element 7 on an alternate basis.

The drastic increase in the total leak value Q immediately after the regular step of resetting each radiation detection element 7 may affect the step of reading the offset data O subsequent to the state of electric charge accumulation. As shown in FIG. 25, on the read-out startup line Ln+1 of the scanning line 5 and each scanning line 5 thereafter, the total leak value Q contained in the offset data O may be greater than the total leak value Q contained in the main image data D (see the broken line of FIG. 24).

Figure 26:
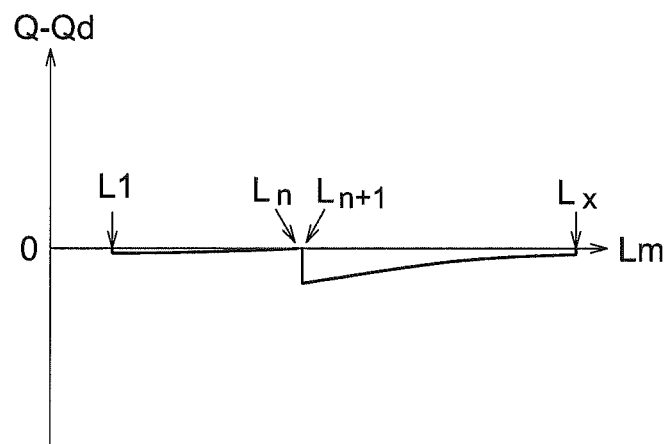
FIG. 26 is a chart formed by plotting for each scanning line the difference value obtained by subtracting the total leak value contained in the offset data from the total leak value included in the main image data.
Figure 27:
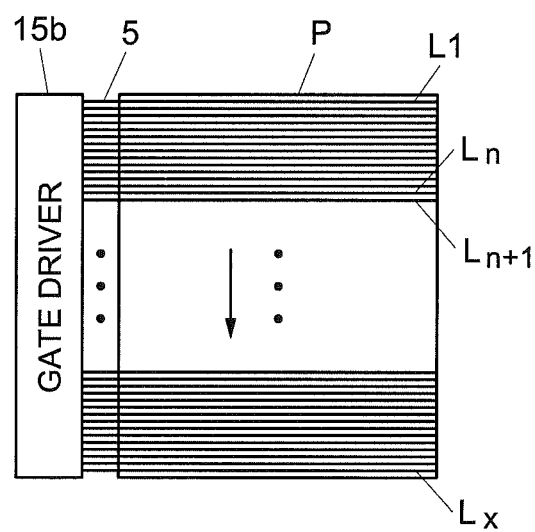
FIG. 27 is an explanatory diagram showing how the image data for detecting the start of irradiation is read out from each radiation detection element by sequential application of on-voltage to each scanning line.

Thus, the difference value Q−Qd obtained by subtracting the total leak value Q contained in the offset data O (hereinafter will be referred to as "the total leak value Qd") from the total leak value Q contained in the main image data D is plotted for each scanning line 5. It has been revealed that a level difference occurs to the difference value Q−Qd between the detection line Ln and read-out startup line Ln+1 of the scanning line 5, as shown in FIG. 26.

As described with reference to the above-mentioned [Structure 1], the offset Od resulting from dark electric charge superimposed on the main image data D and the offset data O is allowed to be the same value, if the processing sequence up to the step of reading the main image data D and the processing sequence up to the step of reading the offset data O are handled as the same processing sequences, and the effective accumulation time Tac for each scanning line 5 is the same for the step of reading the main image data D and the step of reading the offset data O. Thus, canceling-out is executed if the offset data O is subtracted from the main image data D.

However, as described above, if the regular step of resetting each radiation detection element 7 (FIG. 15) is performed subsequent to the step of reading the main image data D and prior to the step of reading the offset data O (FIG. 19), without the step of reading the leak data "d leak" being performed, the offset Oq resulting from the total leak value Q contained in the main image data D becomes a value different from that of the offset Oq resulting from the total leak value Qd contained in the offset data O (FIG. 25), as described above. Accordingly, canceling-out is not performed by the above-mentioned subtraction, with the result that a level difference occurs (FIG. 26).

This is one of the reasons why the offset data O read out in the step of reading the offset data O fails to be equal to the offset superimposed on the main image data D. This is considered as a cause for a level difference produced in the true image data D* (FIG. 28).

To avoid such a phenomenon, it is necessary to design the structure in such a way that the offset Oq resulting from the total leak value Qd (FIG. 25) in the execution of the step of reading the offset data O will be equal to the offset Oq resulting from the total leak value Q (FIG. 24) in the execution of the step of reading the main image data D for each scanning line 5.

The following describes the example of the structure for achieving the above-mentioned objective.

[Structure 2-1]

One way of achieving the above-mentioned objective is to design a structure that does not execute the regular step of resetting each radiation detection element 7 (FIG. 15) without the step of reading the leak data "d leak", subsequent to the step of reading the main image data D and prior to the step of reading the offset data O (FIG. 19).

This structure prevents the total leak value Q from drastically increasing subsequent to the regular step of resetting each radiation detection element 7, as shown in FIG. 25. The transition of the total leak value Qd in the step of reading the offset data O is similar to that of the total leak value Q in the step of reading the main image data D shown in FIG. 24.

Thus, for each radiation detection element 7 (or for each scanning line 5), the offset Oq resulting from the total leak value Qd in the step of reading the offset data O becomes almost the same value as the offset Oq resulting from the total leak value Q in the step of reading the main image data D.

Accordingly, the offset Oq resulting from the total leak value Q contained in the main image data D is cancelled out by the offset Oq resulting from the total leak value Qd contained in the offset data O by subtracting the offset data O from the main image data D, in such a way that the a level difference does not occur to the true image data D*.

As described above, if the structure is so configured that the step of reading the leak data "d leak" and the step of resetting each radiation detection element 7 are executed on an alternate basis in the above-mentioned detection method 1 (FIG. 12), the cycle time i between application of on-voltage to a certain scanning line 5 and application of on-voltage to the next scanning line 5 is longer than that in the regular step of resetting each radiation detection element 7 (FIG. 15) by the time the step of reading the leak data "d leak" is executed.

When this structure has been adopted, let us assume an example of configuring a structure wherein after the step of reading the main image data D, the regular step of resetting each radiation detection element 7 (FIG. 15) is not conducted, as described above, and furthermore, the step of reading the leak data "d leak" and the step of resetting each radiation detection element 7, as shown in FIG. 19, are not conducted either, in such a way that a transfer to the state of electric charge accumulation is carried out immediately after the step of reading the main image data D.

In this case, in the step of reading the main image data D, the step of reading the main image data D is executed subsequent to the state of electric charge accumulation after the above-mentioned long-cycle step of resetting has been executed. In the meantime, in the step of reading the offset data O, the step of reading the offset data O is executed subsequent to the state of electric charge accumulation after reading of the main image data D executed with a cycle time shorter than the above-mentioned long-cycle step of resetting. Thus, for each scanning line 5, the above-mentioned effective accumulation time Tac in the case of reading the main image data D is different from that in the case of reading the offset data O.

Then, as described with reference to the above-mentioned [Cause 1-1], the offset Od resulting from dark electric charge superimposed on the main image data D will be different from the offset resulting from the dark electric charge contained in the offset data O. There will be no canceling-out between these offsets even when the offset data O has been subtracted from the main image data D.

Therefore, the above-mentioned [Structure 2-1] is also configured in such a way that, subsequent to the step of reading the main image data D and prior to the step of reading the offset data O, the step of reading the leak data "d leak" and the step of resetting each radiation detection element 7 are executed on an alternate basis for at least one frame (i.e., at least once for each scanning line 5), as shown in FIG. 19.

If this configuration is adopted, the long-cycle time step of resetting each radiation detection element 7 as well as the step of reading the leak data "d leak" can be executed prior to the state of electric charge accumulation for both the steps of reading the main image data D and reading the offset data O. For each scanning line 5, the above-mentioned effective accumulation time Tac can be set to the same time period for both the steps of reading the main image data D and reading the offset data O.

[Variation in Structure 2-1]

If there is no phenomenon as a prerequisite for the above-mentioned [Cause 1-2], to put it another way, if there is no phenomenon where the potential V of each signal line 6 when the step of resetting each radiation detection element 7 is executed is not different from the potential V of each signal line 6 when the step of reading the leak data "d leak" is executed in the radiation image capturing apparatus 1, the structure can be modified in the manner similar to the case of the [Variation in Structure 1] for the same reason for the above-mentioned [Variation in Structure 1].

To be more specific, in the above-mentioned [Structure 2-1], it is possible to configure the structure in such a way that, instead of the step of reading the leak data "d leak" and the step of resetting each radiation detection element 7 being executed on an alternate basis after the step of reading the main image data D, only the step of resetting each radiation detection element 7 is executed at the same cycle time T.

Further, in the step of reading the main image data D, although unread data remain in each radiation detection element 7 as described above, almost all the unread data are removed from each radiation detection element 7 in the step of resetting each radiation detection element executed alternately with the step of reading the leak data "d leak" for the above-mentioned [Structure 2-1] and in the step of resetting each radiation detection element 7 for the above-mentioned [Variation].

Accordingly as described above, it has been known that, even if the structure is designed in such a way as not to execute the regular step of resetting each radiation detection element 7 (FIG. 15) without the step of reading the leak data "d leak" being executed, the adverse effect of the main image data D left unread does not occur.

[Structure 2-2]

Another structure for achieving the above-mentioned objective is a structure in such a way that the regular step of resetting each radiation detection element 7 (FIG. 15) without the step of reading the leak data "d leak" is executed, for example, subsequent to the step of reading the main image data D and prior to the step of reading the offset data O (FIG. 19). After that, the step of reading the leak data "d leak" and the step of resetting each radiation detection element 7 are executed for a plurality of frames (i.e., several times for each scanning line 5).

As shown in FIG. 25, if the regular step of resetting each radiation detection element 7 (FIG. 15) is executed after the step of reading the main image data D, the total leak value Q becomes a extremely large value. After that, this value is gradually reduced in the course of repeating the step of reading the leak data "d leak" and the step of resetting each radiation detection element 7 on an alternate basis.

Thus, even if the total leak value Q has been increased by executing the regular step of resetting each radiation detection element 7 (FIG. 15) subsequent to the step of reading the main image data D, the total leak value Qd becomes the transition state similar to the case of the total leak value Q in the step of reading the image data D of FIG. 24, if the step of reading the leak data "d leak" and the step of resetting each radiation detection element 7 are performed for the several frames.

Thus, the above-mentioned [Structure 2-2] ensures that the offset Oq resulting from the total leak value Qd in the step of reading the offset data O becomes almost the same value as the offset Oq resulting from the total leak value Q in the step of reading the main image data D for each radiation detection element 7 (or for each scanning line 5).

Accordingly, when the offset data O is subtracted from the main image data D, the offset Oq resulting from the total leak value Q included in the main image data D and the offset Oq resulting from the total leak value Qd included in the offset data O cancel out each other. This prevents a level difference from occurring to the true image data D*.

[Variation in Structure 2-2]

If the phenomenon as a prerequisite to the above-mentioned [Cause 1-2] does not occur, the [Structure 2-2] can be modified similarly to the case of [Variation in Structure 1], for the same reasons as those in the above-mentioned [Variation in Structure 1] and [Variation in Structure 2-1].

To be more specific, the above-mentioned [Structure 2-2] can be configured in such a way that, instead of the step of reading the leak data "d leak" and the step of resetting each radiation detection element 7 being executed on an alternate basis after the step of reading the main image data D, only the step of resetting each radiation detection element 7 is performed as the same cycle time τ.

[Adoption of Detection Method 2]

The above description assumes that the above-mentioned detection method 1 is adopted as a method of detecting the start of irradiation. Even when the above-mentioned detection method 2 is adopted as the method of detecting the start of irradiation, it is possible to configure the same structure as the above-mentioned [Structure 1], [Structure 2-1], [Structure 2-2] or variations thereof The structure is so designed that the same processing sequence as the processing sequence prior to the step of detecting the start of irradiation (FIG. 18) will be executed in the step of reading the offset data O, although not illustrated in the Figure.

To be more specific, for example, as shown in FIG. 18, after the step of reading the main image data D is completed, the step of reading the image data "d" is performed at the same cycle time t as that in the step of reading the image data "d" for detecting the start of irradiation preformed prior to the step of detecting the start of irradiation. Off-voltage is applied to each scanning line 5 from the scanning drive unit 15 for the same time period as that of the state of electric charge accumulation (FIG. 18). After that, the step of reading the offset data O from each radiation detection element 7 is executed at the same cycle time as that of the step of reading the main image data D.

If there is no phenomenon as a prerequisite for the above-mentioned [Cause 1-2], to put it another way, if there is no phenomenon where the potential V of each signal line 6 when the step of resetting each radiation detection element 7 is executed is not different from the potential V of each signal line 6 when the step of reading the image data D or d is executed, the step of resetting each radiation detection element 7 can be executed at the same cycle time T, instead of the step of reading the image data "d" being executed after the step of reading the main image data D.

The above-mentioned structure accurately prevents a level difference from occurring to the true image data D* even if the above-mentioned detection method 2 is adopted as a method of detecting the start of irradiation.

As described above, the radiation image capturing apparatus 1 of the present embodiment permits reading of leak data "d leak" or the image data "d" for detecting the start of irradiation prior to radiation image capturing operation through adoption of the above-mentioned detection method 1 or detection method 2, and detecting the start of irradiation based thereon. This structure ensures the radiation image capturing apparatus 1 itself to detect the start of irradiation accurately.

Further, this structure also permits the same value to be assumed by the offset Od resulting from dark electric charge contained in the image data D as the main image, the offset Oq resulting from the total leak value Q as the total value of the electric charge "q" leaking from each radiation detection element 7, the offset Od resulting from dark electric charge contained in the offset data O and the offset Oq resulting from the total leak value Q, for each radiation detection element 7.

Thus, the offsets Od resulting from dark electric charge or the offsets Oq resulting from the total leak value Q as the total value of the leaked electric charges "q" can be cancelled each other out accurately by subtraction of the offset data O from the image data D as the main image. The offset superimposed on the image data D as the main image and the offset data O are cancelled out with each other accurately.

This precisely prevents a level difference from occurring to the true image data D* calculated for each radiation detection element 7 by subtraction of the offset data O from the image data D as the main image (FIG. 28). For example, when the radiation image captured by the radiation image capturing apparatus 1 is used for diagnosis in the medical treatment, this precisely prevents a streak from appearing in the radiation image, or a streak and patient's lesion from being overlapped with each other on the radiation image so that the lesion is overlooked.

It goes without saying that the present invention can be modified as appropriate, without being restricted to the above-mentioned embodiment

What is claimed is:
1. A radiation image capturing apparatus comprising:
   a detecting section including:
      a plurality of scanning lines and a plurality of signal lines provided to cross each other; and
      a plurality of radiation detection elements arranged in a two-dimensional array in small regions partitioned by the plurality of scanning lines and the plurality of signal lines;
   a scanning drive unit which applies on-voltage or off-voltage to each of the scanning lines;
   switch units each connected to each of the scanning lines so as to discharge electric charge accumulated in the radiation detection elements to the signal lines when the on-voltage is applied;
   a reading circuit for converting the electric charge discharged from the radiation detection elements, into image data to read the image data; and
   a control device for controlling at least the scanning drive unit and the reading circuit to perform processing of reading the image data from the radiation detection elements,
   wherein the control device is configured to, prior to radiation image capturing operation, alternately execute processing of reading leak data and processing of resetting each of the radiation detection elements,
   wherein the control device performs the processing of reading the leak data by converting the electric charge having leaked from the radiation detection elements through the switch units into the leak data, after allowing the scanning drive unit to apply off-voltage to each of the scanning lines so that each of the switch units is turned off, and performs the processing of resetting each of the radiation detection elements by allowing the scanning drive unit to sequentially apply on-voltage to each of the scanning lines,
   wherein the control device, when detecting a start of irradiation when the read leak data exceeds a threshold value, allows the scanning drive unit to apply the off-voltage to each of the scanning lines so as to conduct transfer to a state of electric charge accumulation so that the electric charge generated by the irradiation is accumulated in each of the radiation detection elements, and the control device performs the processing of reading the image data from each of the radiation detection elements after the transfer to the state of electric charge accumulation, and
   wherein the control device, after the processing of reading the image data, executes the processing of reading the leak data and the processing of resetting each of the radiation detection elements alternately, with a same cycle as the processing of reading the leak data and the processing of resetting each of the radiation detection elements which have been performed prior to detecting the start of irradiation, and the control device allows the scanning drive unit to apply the off-voltage to each of the scanning lines for a same time period as the state of electric charge accumulation, and then performs the processing of reading the offset data from each of the radiation detection elements with a same cycle as the processing of reading the image data.

2. The radiation image capturing apparatus of claim 1, wherein the control device is configured to, after the processing of reading the image data, perform the processing of reading the leak data and the processing of resetting each of the radiation detection elements alternately so as to perform at least once for each of the scanning lines, the processing of resetting each of the radiation detection elements which is carried out alternately with the processing of reading the leak data, without performing the processing of resetting each of the radiation detection elements which is not accompanied by the processing of reading the leak data.

3. The radiation image capturing apparatus of claim 1, wherein the control device is configured to, after the processing of reading the image data, perform the processing reading the leak data and the processing of resetting each of the radiation detection elements alternately so as to perform more than once for each of the scanning lines, the processing of resetting each of the radiation detection elements which is performed alternately with the processing of reading the leak data, after performing the processing of resetting each of the radiation detection elements which is not accompanied by the processing of reading the leak data.

4. The radiation image capturing apparatus of claim 1,
wherein the control device is configured to, after the processing of reading image data, perform only the processing of resetting each of the radiation detection elements at least once for each of the scanning lines with a same cycle as the processing of resetting each of the radiation detection elements which has been carried out alternately with the processing of reading the leak data before detecting the start of irradiation, without performing the processing of resetting each of the radiation detection elements which is not accompanied by the processing of reading the leak data, instead of performing the processing of reading the leak data and the processing of resetting each of the radiation detection elements alternately with a same cycle as the processing of reading the leak data and the processing of resetting each of the radiation detection elements which have been carried out before detecting the start of irradiation.

5. The radiation image capturing apparatus of claim 1,
wherein the control device is configured to, after the processing of reading image data, perform only the processing of resetting each of the radiation detection elements more than once for each of the scanning lines with a same cycle as the processing of resetting each of the radiation detection elements which has been carried out alternately with the processing of reading the leak data before detecting the start of irradiation, after performing the processing of resetting each of the radiation detection elements which is not accompanied by the processing of reading the leak data, instead of performing the processing of reading the leak data and the processing of resetting each of the radiation detection elements alternately with a same cycle as the processing of reading the leak data and the processing of resetting each of the radiation detection elements which have been carried out before detecting the start of irradiation.

6. A radiation image capturing apparatus comprising:
a detecting section including:
    a plurality of scanning lines and a plurality of signal lines provided to cross each other; and
    a plurality of radiation detection elements arranged in a two-dimensional array in small regions partitioned by the plurality of scanning lines and the plurality of signal lines;
a scanning drive unit which applies on-voltage or off-voltage to each of the scanning lines;
switch units each connected to each of the scanning lines so as to discharge electric charge accumulated in the radiation detection elements to the signal lines when the on-voltage is applied;
a reading circuit for converting the electric charge discharged from the radiation detection elements, into image data to read the image data; and
a control device for controlling at least the scanning drive unit and the reading circuit to perform processing of reading the image data from the radiation detection elements,
wherein the control device, prior to radiation image capturing operation, allows the scanning drive unit to apply the on-voltage sequentially to each of the scanning lines, and executes the processing of reading the image data for detecting a start of irradiation,
wherein the control device, when detecting the start of irradiation when the read image data exceeds a threshold value, allows the scanning drive unit to apply the off-voltage to each of the scanning lines so as to conduct transfer to a state of electric charge accumulation so that the electric charge generated by the irradiation is accumulated in each of the radiation detection elements, and the control device executes the processing of reading the image data as a main image from each of the radiation detection elements after the transfer to the state of electric charge accumulation, and
wherein the control device, after the processing of reading the image data as the main image, executes the processing of reading the image data with a same cycle as the processing of reading the image data for detecting the start of irradiation which has been performed prior to detecting the start of irradiation, and the control device allows the scanning drive unit to apply the off-voltage to each of the scanning lines for a same time period as the state of electric charge accumulation, and then performs the processing of reading the offset data from each of the radiation detection elements with a same cycle as the processing of reading the image data as the main image.

7. The radiation image capturing apparatus of claim 6,
wherein the control device is configured to, after the processing of reading the image data as the main image, perform the processing of reading the image data at least once for each of the scanning lines with a same cycle as the processing of reading the image data for detecting the start of irradiation which has been carried out before detecting the start of irradiation, without performing the processing of resetting each of the radiation detection elements.

8. The radiation image capturing apparatus of claim 6,
wherein the control device is configured to, after the processing of reading the image data as the main image and after performing the processing of resetting each of the radiation detection elements, perform the processing of reading the image data more than once for each of the scanning lines with a same cycle as the processing of reading the image data for detecting the start of irradiation which has been carried out before detecting the start of irradiation.

9. The radiation image capturing apparatus of claim 6,
wherein the control device is configured to, after the processing of reading the image data as the main image, perform only the processing of resetting each of the radiation detection elements at least once for each of the scanning lines with a same cycle as the processing of reading the image data for detecting the start of irradiation which has been carried out before detecting the start of irradiation, instead of performing the processing of reading the image data with a same cycle as the processing of reading the image data for detecting the start of irradiation which has been carried out before detecting the start of irradiation.

10. The radiation image capturing apparatus of claim 6,
wherein the control device is configured to, after the processing of reading the image data as the main image and after performing the processing of resetting each of the radiation detection elements, perform only the processing of resetting each of the radiation detections elements more than once for each of the scanning lines with a same cycle as the processing of reading the image data for detecting the start of irradiation which has been carried out before detecting the start of irradiation, instead of performing the processing of reading the image data with a same cycle as the processing of reading the image data for detecting the start of irradiation which has been carried out before detecting the start of irradiation.

* * * * *